(12) United States Patent
Okuno

(10) Patent No.: US 7,683,964 B2
(45) Date of Patent: Mar. 23, 2010

(54) IMAGE CAPTURING APPARATUS AND IMAGE CAPTURING METHOD

(75) Inventor: Takayuki Okuno, Saitama (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 11/514,213

(22) Filed: Sep. 1, 2006

(65) Prior Publication Data

US 2007/0052840 A1 Mar. 8, 2007

(30) Foreign Application Priority Data

Sep. 5, 2005 (JP) ............................. 2005-257072
Sep. 5, 2005 (JP) ............................. 2005-257073

(51) Int. Cl.
*H04N 5/238* (2006.01)

(52) U.S. Cl. ...................... 348/364; 348/362

(58) Field of Classification Search ....................... None
See application file for complete search history.

(56) References Cited

U.S. PATENT DOCUMENTS

| 4,929,824 | A | * | 5/1990 | Miyazaki ..................... 382/274 |
| 5,049,997 | A | * | 9/1991 | Arai ........................... 348/364 |
| 5,414,487 | A | * | 5/1995 | Iwasaki ........................ 396/234 |
| 6,167,200 | A | * | 12/2000 | Yamaguchi et al. ............ 396/65 |
| 2004/0017498 | A1 | * | 1/2004 | Yamashita et al. ........... 348/315 |
| 2004/0101296 | A1 | * | 5/2004 | Nakata et al. ................. 396/65 |

FOREIGN PATENT DOCUMENTS

| JP | 03-240030 A | 10/1991 |
| JP | 07-027151 A | 3/1995 |

* cited by examiner

*Primary Examiner*—David L Ometz
*Assistant Examiner*—Angel L Garces-Rivera
(74) *Attorney, Agent, or Firm*—Rader, Fishman & Grauer PLLC

(57) ABSTRACT

An image capturing apparatus which keeps down an increase in the amount of processing at the time of exposure determination and at the same time enables effective utilization of the improved photometry resolution for back light detection, an which has a luminance calculation unit dividing image data output from an image capturing device into a plurality of regions and measuring the luminance of each and an exposure control unit generating and grouping a plurality of intermediate regions from the object luminances output from the luminance calculation unit, generating an exposure evaluation value from the luminances of the intermediate regions, and suitably controlling the exposure for image capture in accordance with the measured luminances, and an image capturing method used for the same.

16 Claims, 42 Drawing Sheets

EACH INTERMEDIATE REGION IN OBJECT FIELD AS A WHOLE

EXAMPLE OF PORTRAIT PHOTO WITH SCENERY IN BACKGROUND UNDER BACK LIGHT

RESULTS OF PHOTOMETRY AFTER REPEATED EXECUTION OF STEPS S50 TO S90

FIRST INTERMEDIATE REGIONS PREPARED BY SCAN OF PERIPHERAL LUMINANCES

EXAMPLE OF FIRST INTERMEDIATE REGIONS PREPARED BY RECTANGLE GENERATION PROCESSING

PREPARATION OF SECOND INTERMEDIATE REGIONS AT PERIPHERY OF FIRST INTERMEDIATE REGIONS

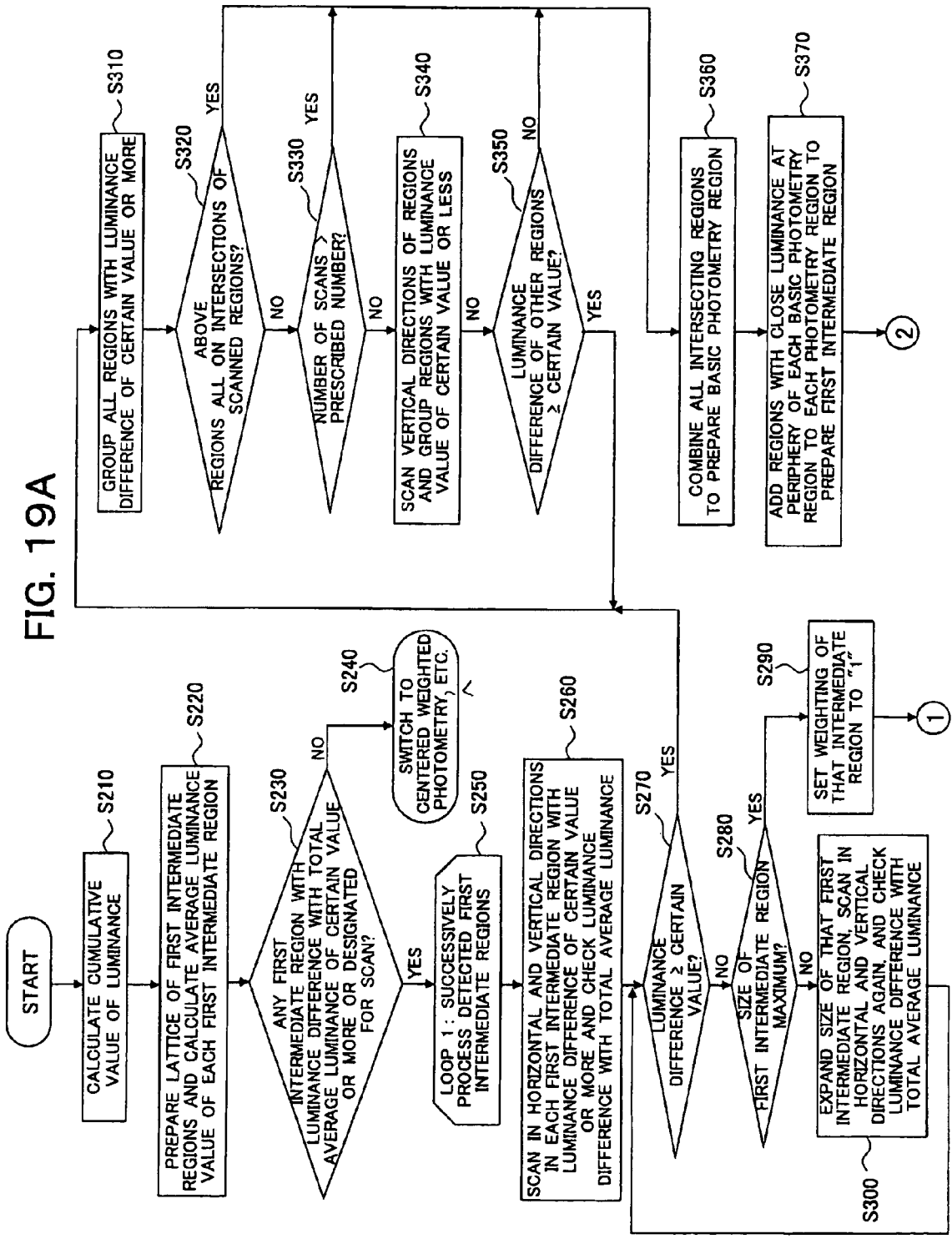

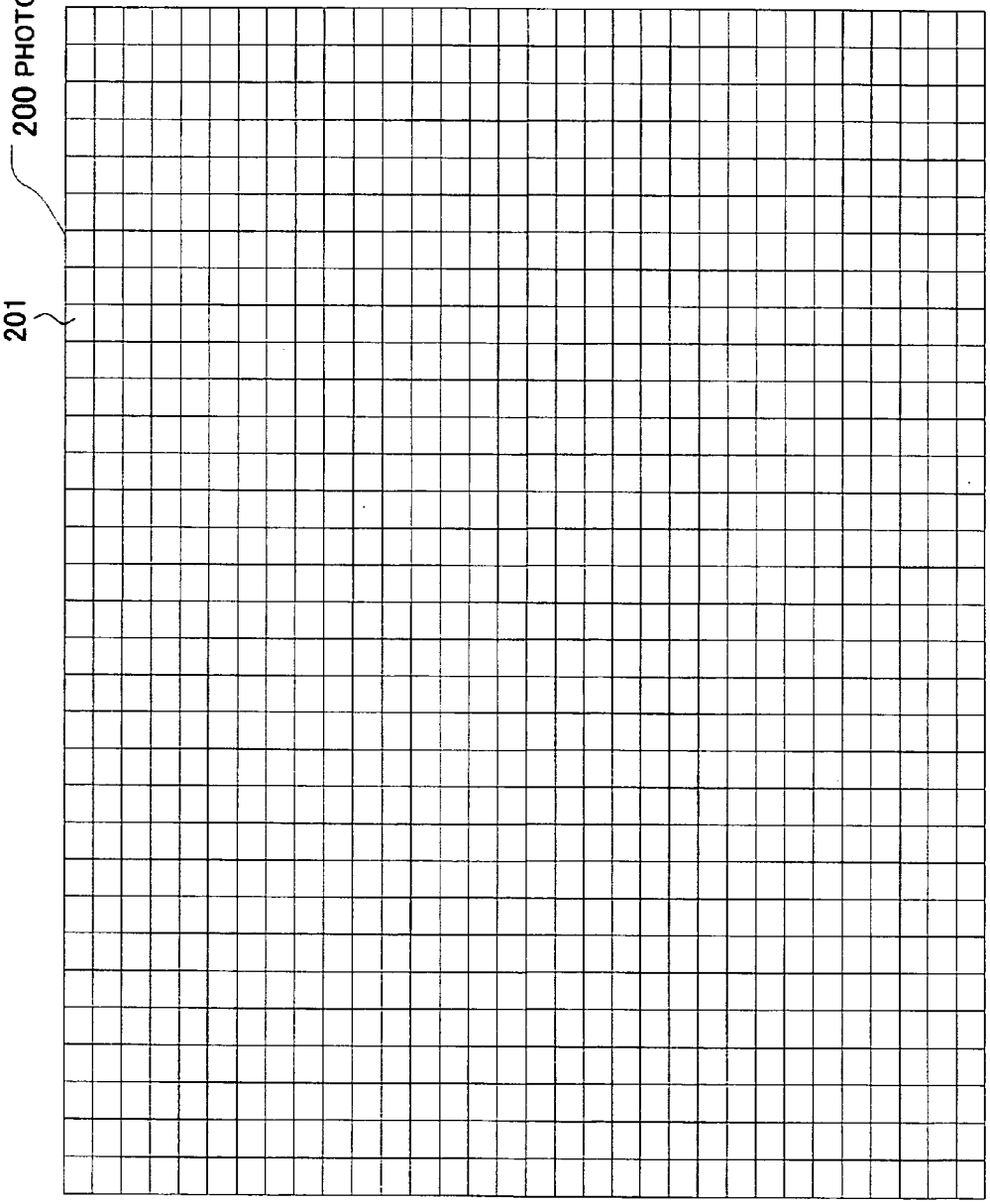

EXAMPLE OF PORTRAIT PHOTO WITH SCENERY IN BACKGROUND UNDER BACK LIGHT

EXAMPLE OF DIVISION OF OBJECT SHOWN IN FIG.21 FOR PHOTOMETRY

EXAMPLE OF GROUPING OF OBJECT SHOWN IN FIG. 21 INTO INTERMEDIATE REGIONS

EXAMPLE OF COMBINING ADJOINING REGIONS TO EXPAND FIRST INTERMEDIATE REGION

EXAMPLE OF BASIC PHOTOMETRY REGION

EXAMPLE OF BASIC PHOTOMETRY REGIONS IN CASE WHERE THERE ARE PLURALITY OF REGIONS WITH LARGE LUMINANCE DIFFERENCE

EXAMPLE OF SECOND INTERMEDIATE REGIONS 206

SECOND INTERMEDIATE REGIONS PREPARED BY SCANNING OF PERIPHERAL LUMINANCES

EXAMPLE OF SECOND INTERMEDIATE REGIONS PREPARED 205
BY RECTANGLE GENERATION PROCESSING

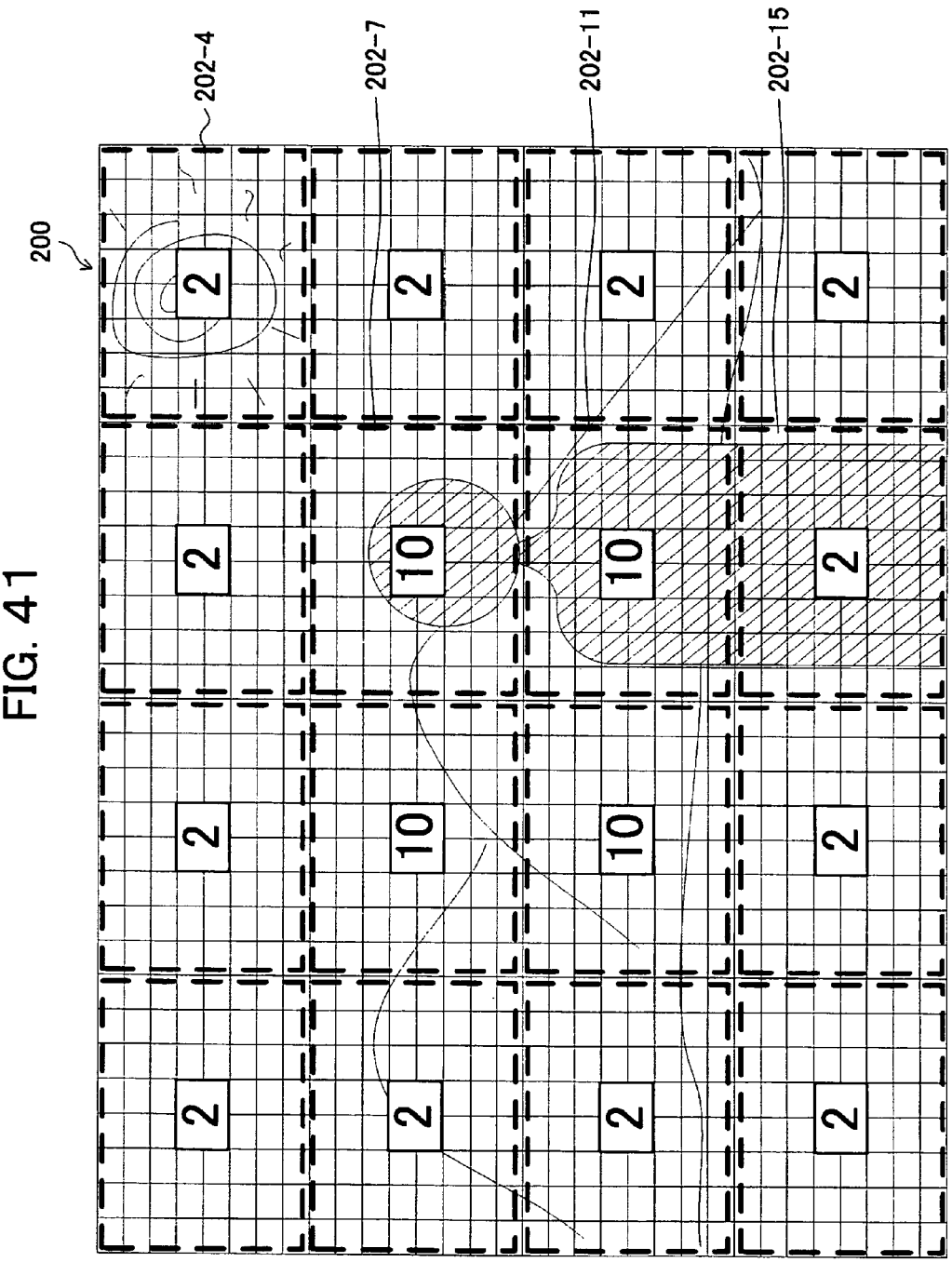

IMAGE CAPTURING APPARATUS AND IMAGE CAPTURING METHOD

CROSS REFERENCE TO RELATED APPLICATIONS

The present invention contains subject matter related to Japanese Patent Applications No. 2005-257072 and No. 2005-257073 filed in the Japan Patent Office on Sep. 5, 2005, the entire contents of which being incorporated herein by reference.

BACKGROUND OF THE INVENTION

1. Field of the Invention

The present invention relates to an image capturing apparatus, such as a digital camera, and an image capturing method.

2. Description of the Related Art

As technology for cameras, etc., there is the so-called multi-segment photometry system which divides an object field into a lattice of a plurality of regions for photometry processing. For example, the art disclosed in Japanese Patent Publication (B2) No. 7-27151 calls for dividing a screen into 15 small regions, grouping together these into regions where the main object is present, intermediate regions grouping their peripheries, and other regions and using the luminance difference of the intermediate regions to judge the back light state.

SUMMARY OF THE INVENTION

However, with the method disclosed in Japanese Patent Publication (B2) No. 7-27151, there was the disadvantage that when there was an object smaller than a photometry region or objects with a close luminance in a photometry region, the back light state could not be accurately detected.

As a technique to make up for this disadvantage, for example, as disclosed in Japanese Patent Publication (A) No. 3-240030, the technique is known of using a focus detection image sensor to obtain object luminance information and thereby detect the back light state of a small object.

The method disclosed in Japanese Patent Publication (A) No. 3-240030 can be utilized with a so-called phase difference detection AF system. However, it may be impossible to use in a camera using only the so-called contrast detection AF system not using a focus detection image sensor, but detecting a change in the contrast of an output image from an imager to detect the focus point. Further, when another object with a close luminance was close to the side of the main object, sometimes the back light state failed to be detected.

This can be dealt with by increasing the number of division of the photometry device and improving the photometry resolution of the object. In particular, by using the output of the photometry device of a digital camera for photometry, the number of division can be further increased for photometry. However, if increasing the number of division, the amount of processing at the time of exposure determination also increases, so the general practice is to use the photometry resolution not to detect the state of the object, but to use it in improving the degree of freedom of shape of grouping together photometry regions.

It is therefore desirable in the present invention to provide an image capturing apparatus and image capturing method enabling the increase in the amount of processing at the time of exposure determination to be kept down and at the same time enabling effective use of the improved photometry resolution for back light detection.

According to a first embodiment of the present invention, there is provided an image capturing apparatus having an image capturing means, a photometry means for dividing image data output from the image capturing means into a plurality of regions and measuring a luminance of each of the divided regions, a grouping means for generating a plurality of intermediate regions from object luminances output from the photometry means, an evaluation value calculating means for generating an exposure evaluation value from the luminances of the intermediate regions, and a control means for suitably controlling the exposure for image capture in accordance with the measured luminances.

According to a second embodiment of the present invention, there is provided an image capturing apparatus having an image capturing unit, a photometry unit configured to divide image data output from the image capturing unit into a plurality of regions and measure a luminance of each of the divided regions, a grouping unit configured to generate a plurality of intermediate regions from object luminances output from the photometry unit, an evaluation value calculation unit configured to generate an exposure evaluation value from luminances of the intermediate regions, and a control unit configured to suitably control the exposure for image capture in accordance with the measured luminances.

According to a third embodiment of the present invention, there is provided an image capturing apparatus having an image capturing means, a photometry means for dividing image data output from the image capturing means into a plurality of regions and measuring a luminance of each of the divided regions, a grouping means for generating a plurality of intermediate regions from object luminances output from the photometry means, an evaluation value calculating means for generating an exposure evaluation value from luminances of the intermediate regions, and a control means for suitably controlling the exposure for image capture in accordance with the measured luminance, wherein the grouping means includes a means for dividing object luminance information output from the photometry means into a plurality of first intermediate regions, scanning first intermediate regions with a luminance difference from a total average luminance of a certain value or more or a designated one or more first intermediate regions in the horizontal and vertical directions to confirm the luminance difference from the total average luminance, and grouping any region with a luminance difference of a certain value or more as second intermediate regions.

According to a fourth embodiment of the present invention, there is provided an image capturing apparatus having an image capturing unit, a photometry unit configured to divide image data output from the image capturing unit into a plurality of regions and measure a luminance of each of the divided regions, a grouping unit configured to generate a plurality of intermediate regions from object luminances output from the photometry unit, an evaluation value calculation unit configured to generate an exposure evaluation value from luminances of the intermediate regions, and a control unit configured to suitably control the exposure for image capture in accordance with the measured luminances, wherein the grouping unit is configured to divide object luminance information output from the photometry unit into a plurality of first intermediate regions, scan first intermediate regions with a luminance difference from a total average luminance of a certain value or more and a designated one or more first intermediate regions in the horizontal and vertical directions to confirm the luminance difference from the total average luminance, and group any region with a luminance difference of a certain value or more as second intermediate regions.

According to a fifth embodiment of the present invention, there is provided an image capturing method including the steps of dividing image data output from an image capturing means into a plurality of regions, measuring an object luminance of each of the divided regions, generating a plurality of intermediate regions from the measured object luminances, generating an exposure evaluation value from the luminances of the intermediate regions, and suitably controlling the exposure for image capture in accordance with the measured luminances.

According to a sixth embodiment of the present invention, there is provided an image capturing method including the steps of dividing image data output from an image capturing means into a plurality of regions, measuring an object luminance of each of the divided regions, generating a plurality of intermediate regions from the measured object luminances, generating an exposure evaluation value from the luminances of the intermediate regions, and suitably controlling the exposure for image capture in accordance with the measured luminances, wherein the third step further comprises a step of dividing object luminance information output at the second step into a plurality of first intermediate regions, scanning first intermediate regions with a luminance difference from a total average luminance of a certain value or more or a designated one or more first intermediate regions in the horizontal and vertical directions to confirm the luminance difference from the total average luminance, and grouping any region with a luminance difference of a certain value or more as second intermediate regions.

According to the embodiment of the present invention, in the photometry means, image data output from the image capturing means is divided into a plurality of regions. Further, a luminance of each of the divided regions is measured in the photometry means and the measured luminances are supplied to the grouping means and the control means.

In the grouping means, a plurality of intermediate regions are generated from the measured object luminances and supplied the same to the evaluation value calculating means.

In the evaluation value calculating means, an exposure evaluation value is generated from the luminances of the intermediate regions, and the control means suitably controls the exposure for image capture in accordance with the measured luminances.

BRIEF DESCRIPTION OF THE DRAWINGS

These and other objects and features of the present invention will become clearer from the following description of the preferred embodiments given with reference to the attached drawings, wherein:

FIGS. 19A and 19B are flow charts for explaining an example of the operation of the image capturing apparatus shown in FIG. 18.

FIG. 20 is a view for explaining an example of the operation of an image capturing apparatus shown in FIG. 18 and shows an example of the division of a captured image.

FIG. 41 is a view for explaining an example of the operation of an image capturing apparatus shown in FIG. 18 and shows an example of the determination of a second weighting value in each first intermediate region.

DESCRIPTION OF THE PREFERRED EMBODIMENTS

Below, an image capturing apparatus according to embodiments of the present invention will be explained with reference to the drawings.

Figure 1:
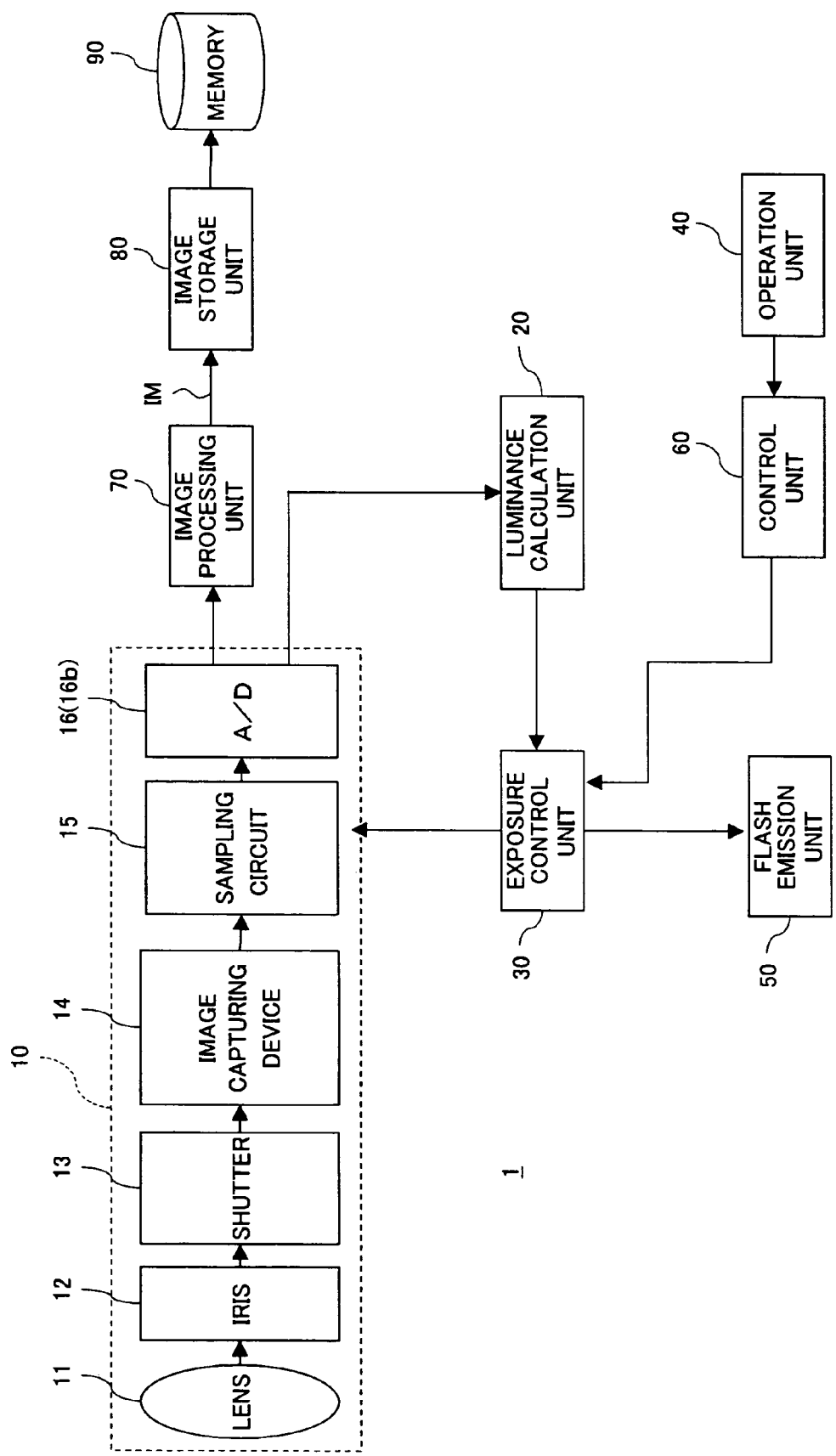
FIG. 1 is a view of the overall configuration of an image capturing apparatus according to a first embodiment of the present invention.

FIG. 1 is a view of the overall configuration of an image capturing apparatus according to a first embodiment of the present invention.

The image capturing apparatus 1, as shown in FIG. 1, for example, has a camera module 10, a luminance calculation unit 20, an exposure control unit 30, an operation unit 40, a flash emission unit 50, a control unit 60, an image processing unit 70, an image storage unit 80, and memory 90. Note that in this image capturing apparatus 1, the exposure control unit 30, the control unit 60, and the image processing unit 70 may be realized by electronic circuits or may be realized by a processor running a program.

Camera Module 10

The camera module 10 has, for example, a lens 11, an iris 12, a shutter 13, an image capturing device 14, a sampling circuit 15, and an analog/digital (A/D) conversion circuit 16. The lens 11 receives light from the captured object and emits it to the iris 12. The iris 12 focuses the light received from the lens 11 and emits it to the shutter 13. The shutter 13 opens for exactly a predetermined time (shutter time) under the control of the exposure control unit 30. When open, the shutter 13 focuses the light received from the iris 12 on the image capturing device 14.

The image capturing device 14 is configured by a charge coupled device (CCD), a complementary metal oxide semiconductor (CMOS) sensor, etc. and focuses the light of the object received through the shutter 13. The image capturing device 14 converts the amount of received light reaching each light receiving element on the image capturing surface to an electrical signal by opto-electric conversion and outputs the image signals converted to the electrical signals to the sampling circuit 15. The image capturing device 14 is, for example, a single-plate sensor. Each electrical signal output to the sampling circuit 15 is a one color signal (data) of either of a R signal, G signal, or B signal per pixel.

The sampling circuit 15 removes the noise component of the image signal (electrical signal) supplied from the image capturing device 14 by, for example, correlated double sampling and supplies the result to the A/D conversion circuit 16. The A/D conversion circuit 16 converts the image signal input from the sampling circuit 15 from an analog to a digital format, that is, samples and quantifies it. After that, the A/D conversion circuit 16 outputs the image signal to the luminance calculation unit 20 and the image processing unit 70.

Luminance Calculation Unit 20

The luminance calculation unit 20 divides the image data obtained from the camera module 10 by an image capture operation into a plurality of small regions and performs processing for cumulatively adding the luminance of each small region. This cumulative addition processing is performed by converting the RGB signal data in each small region to luminance values and cumulatively adding the luminance values for each region. The cumulative luminance value of each region calculated is output to the exposure control unit 30.

Exposure Control Unit 30

The exposure control unit 30 calculates the suitable exposure value from the cumulative luminance values of the small regions input from the luminance calculation unit 20 based on the exposure control mode and photometry mode designated from the control unit 60 and controls the iris 12, shutter 13, image capturing device 14, sampling circuit 15, and A/D conversion circuit 16 for capturing an image by that suitable exposure value. The method of calculating the suitable exposure value will be explained later.

Further, the exposure control unit 30 judges whether to emit a flash based on the above calculated suitable exposure value, the exposure control mode designated by the control unit 60, and setting information set by the user by the operation unit 40. When emitting a flash, the already acquired exposure information is used to calculate the insufficient amount of light and determine the amount of light of the flash emitted and that is designated to the flash emission unit 50. Further, it is also possible to preliminarily emit a flash in a provisional image capture and use the exposure information obtained based on the result of that operation to determine the amount of emission of the flash and to designate that to the flash emission unit 50. The above provisional image capture is, for example, performed when the user presses down the shutter button of the operation unit 40 halfway or just before he presses down the shutter button of the operation unit 40 all the way and starts the main image capture operation.

The exposure control unit 30 of the present embodiment, as explained in detail later, has a grouping function of producing a plurality of intermediate regions from the object luminances output from the luminance calculation unit 20, an evaluation value calculation function of producing an exposure evaluation value from the intermediate region luminances, and a control function for suitably controlling the exposure for image capture in accordance with the calculated luminances. The grouping function scans the object luminance information output from the luminance calculation unit 20 in the horizontal and vertical directions from the observation point to confirm the difference between the luminances of the small photometry regions and the average luminance of the object field as a whole and groups the high luminance regions and low luminance regions of the object field as first intermediate regions. When scanning the luminance values in the horizontal and vertical directions, the grouping function can set the observation point at the center of the screen, a measurement point, a face detection region, or another other point designated by the user or can set a plurality of observation points combining a plurality of the same. The grouping function searches for the luminances of the periphery of the generated first intermediate regions and groups regions meeting predetermined conditions as second intermediate regions.

Further, the evaluation value calculation function of the exposure control unit 30 weights the intermediate regions in accordance with the luminance differences between the generated first intermediate regions and second intermediate regions. Further, the evaluation value calculating function weights the intermediate regions in accordance with the positions of the generated first intermediate regions and second intermediate regions and the areas of the first intermediate regions. Further, the evaluation value calculation function calculates the weighted object luminances obtained by weighting the object luminances measured by the photometry unit in accordance with the weighting.

Operation Unit 40

The operation unit 40 is, for example, configured by a shutter button, setting buttons for setting the exposure control mode and photometry mode, setting buttons for setting flash emission, etc.

Flash Emission Unit 50

The flash emission unit 50 emits a flash when receiving a flash emission signal from the exposure control unit 30. The flash emission unit 50 is set so as to emit the flash toward the image capturing direction of the camera module 10.

Control Unit 60

The control unit 60 sets the exposure control mode and photometry mode in, for example, the exposure control unit 30 in accordance with the operation of the operation unit 40 by the user, instructs the start of photometry processing to the exposure control unit 30, or instructs the start of the image capture operation in accordance with the operation of the shutter button of the operation unit 40 by the user.

Image Processing Unit 70

The image processing unit 70 reads the image data obtained by the series of captures from the image memory 20, performs, for example, white balance correction, image compression, or other processing, and outputs the result to the image storage unit 80. The image storage unit 80 writes the data IM input from the image processing unit 70 into the memory 90. The memory 90 is a flash memory, a hard disk, or other storage medium.

Figure 2:
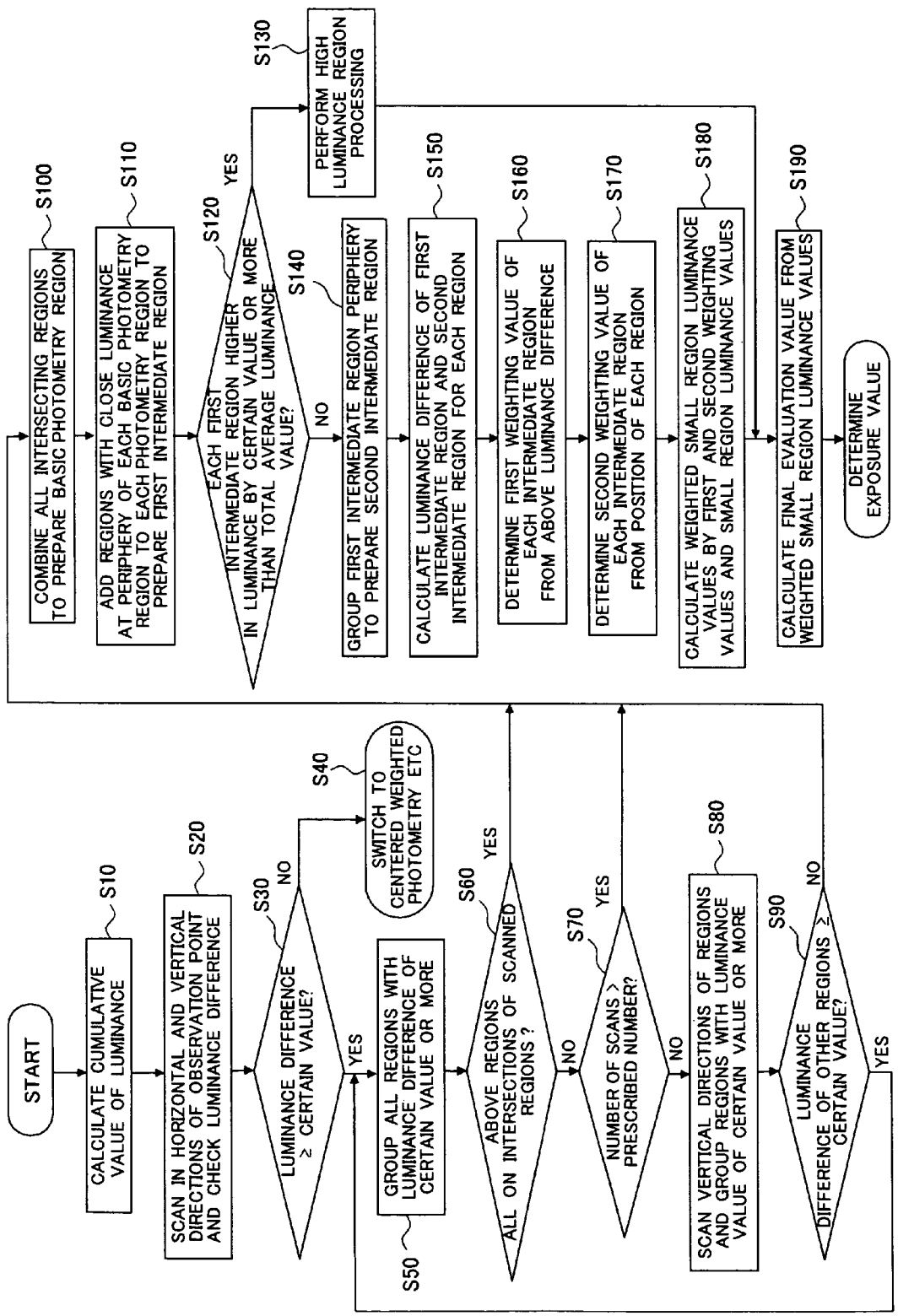
FIG. 2 is a flow chart for explaining an example of the operation of the image capturing apparatus shown in FIG. 1.

Below, an example of the operation of the image capturing apparatus shown in FIG. 1 will be explained by focusing on the processing of the exposure control unit 30 with reference to FIG. 2 to FIG. 17. FIG. 2 is a flow chart for explaining an example of the operation of the image capturing apparatus shown in FIG. 1.

Step S10

Figure 3:
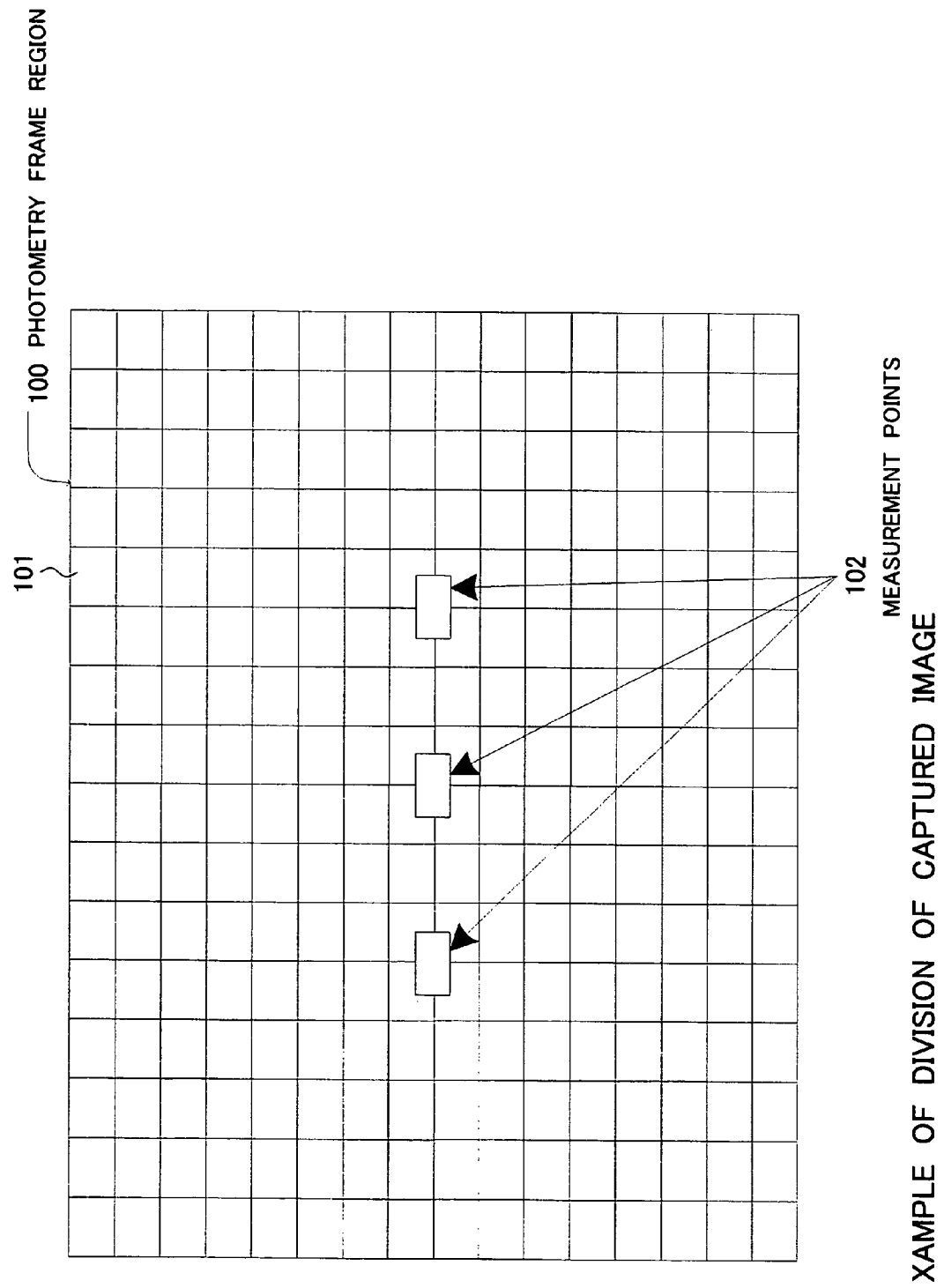
FIG. 3 is a view for explaining an example of the operation of an image capturing apparatus shown in FIG. 1 and shows an example of division of the captured image.
Figure 4:
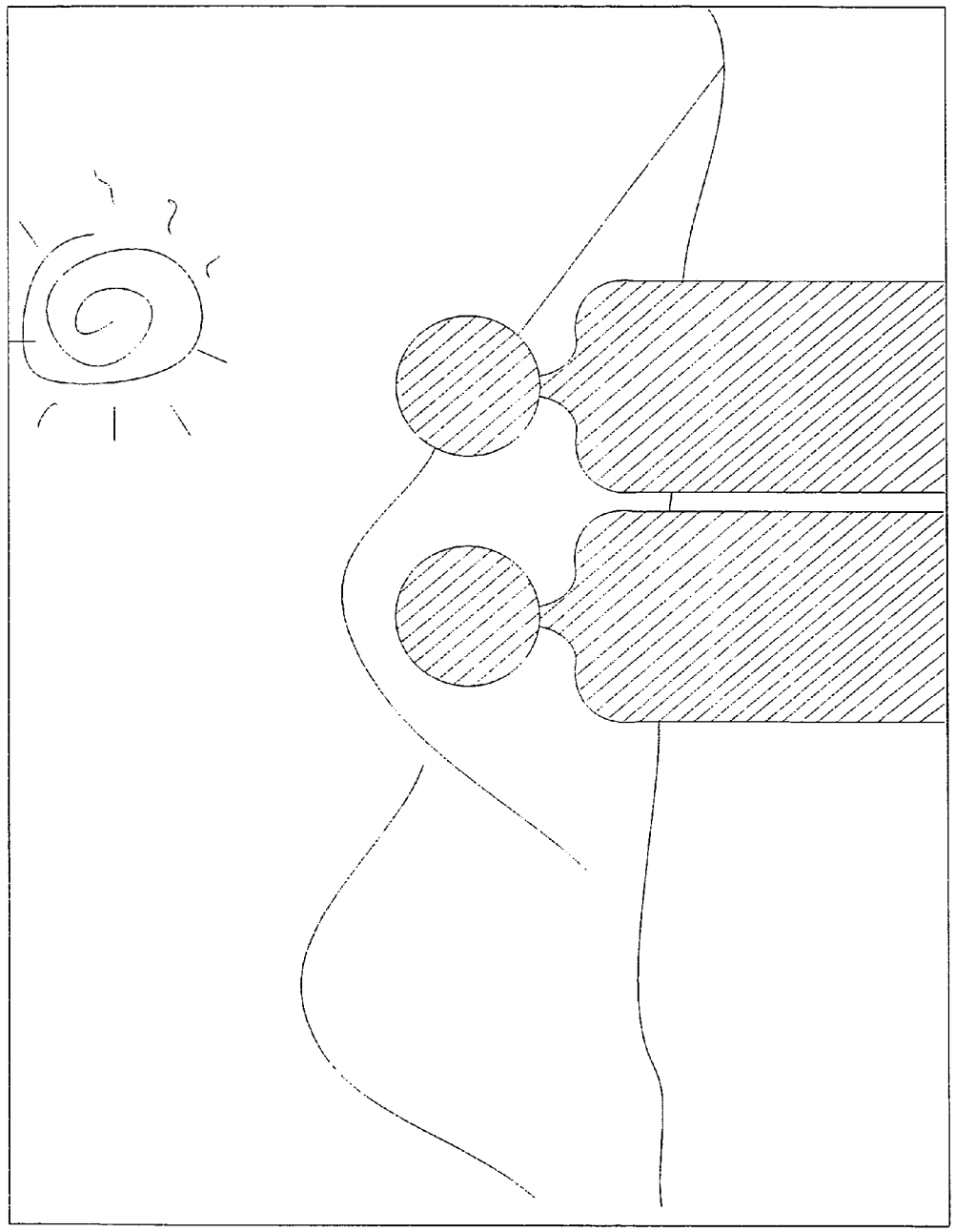
FIG. 4 is a view for explaining an example of the operation of an image capturing apparatus shown in FIG. 1 and shows an example of a portrait photo taken with scenery in the background under back light.
Figure 5:
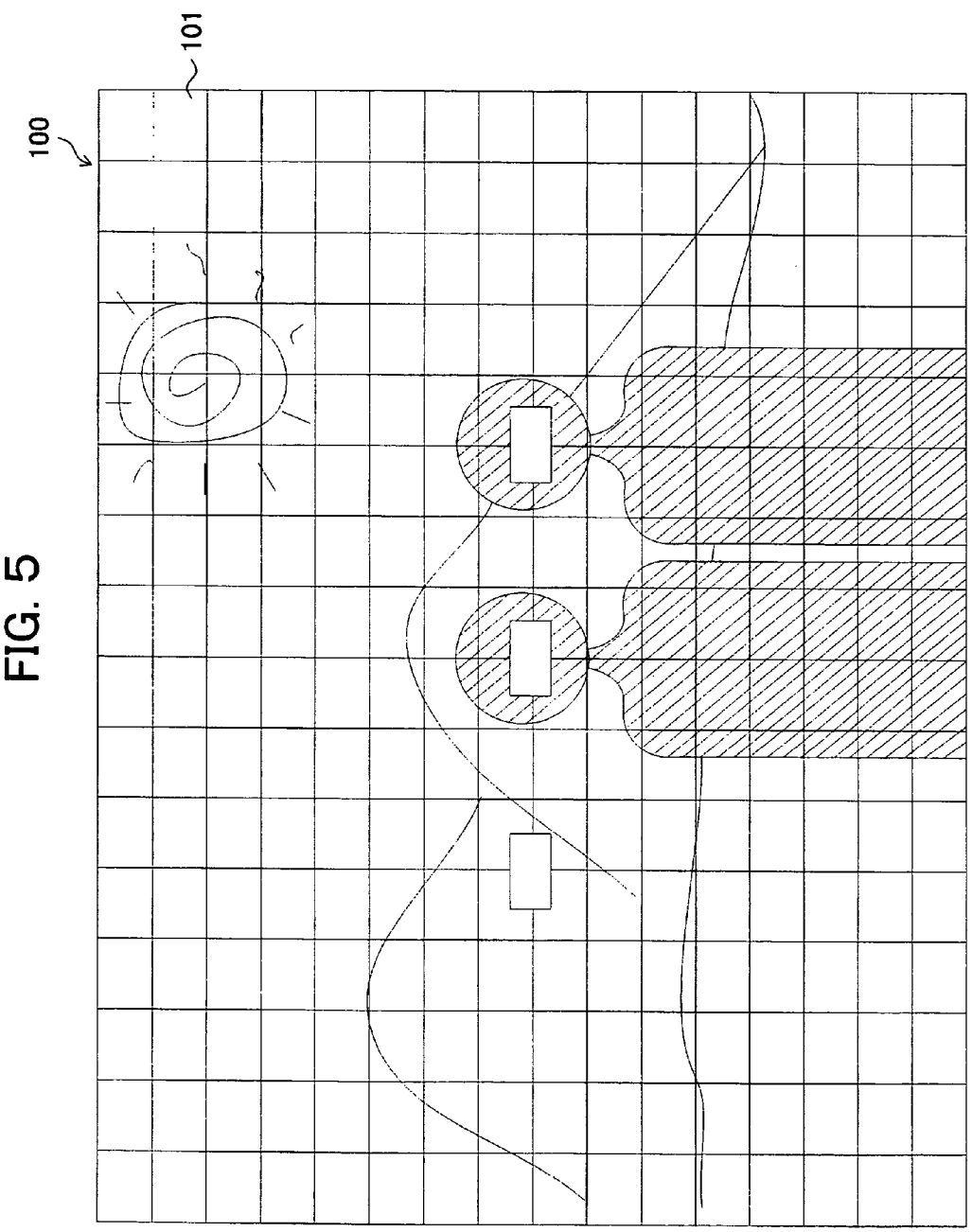
FIG. 5 is a view for explaining an example of the operation of an image capturing apparatus shown in FIG. 1 and shows an example of divided photometry of the object shown in FIG. 4.

The luminance calculation unit 20, based on the exposure control mode or the photometry mode set by the operation unit 40 at the exposure control unit 30, divides the image captured by the camera module 10, for example, as shown in FIG. 3, the photometry frame region 100 forming a predetermined rectangle, into a plurality of small regions 101 and calculates the cumulative luminance values of the small regions 101. In FIG. 3, reference numeral 102 shows measurement points. In the present embodiment, considering the convenience of explanation, an example is shown of division into 16×16 or 256 small regions for photometry, but this number of division is just one example. The invention is not limited to 256 regions. For example, when taking the photograph as shown in FIG. 4, the object field is divided into the small regions 101 for photometry as shown in FIG. 5. The cumulative luminance value of each small region 101 obtained by the photometry is output to the exposure control unit 30.

Step S20

Figure 6:
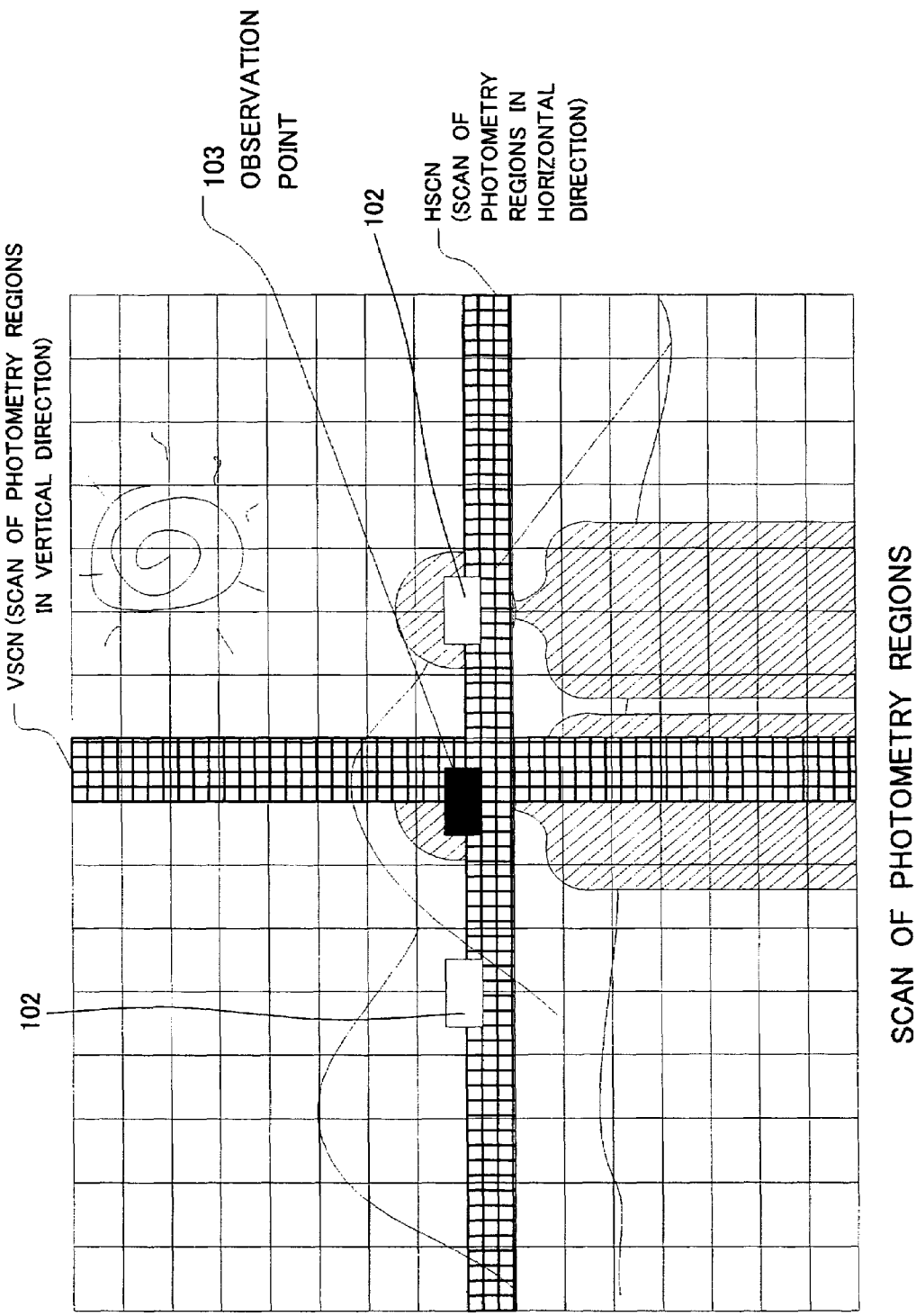
FIG. 6 is a view for explaining an example of the operation of an image capturing apparatus shown in FIG. 1 and shows a scan operation of photometry regions.

The exposure control unit 30, as shown in FIG. 6, scans the cumulative luminance values of the small regions in the horizontal and vertical directions from the observation point 103 of the object field (VSCN, HSCN) and compares the luminance of each small region and the average luminance of the object field as a whole. As the observation point 103, for example, the center of the screen may be made the observation point. Alternatively, a measurement point 102 selected as the focal point by the focus detection unit (not shown) may be used. Further, the observation point 103 may be determined by face detection, etc., as illustrated in the publications, etc. Alternatively, any point designated by the operation unit 40 may be used. In the present embodiment, the example of use of the measurement point 102 positioned at the center as the observation point 103 is shown.

Step S30

The exposure control unit 30 judges if the results of comparison obtained from step S20 include regions where the difference from the total average luminance is a certain value or more (for example, 2 EV or more). When judging that there are regions where the luminance difference is a certain value or more, the routine proceeds to step S50, while when judging there are not, the routine proceeds to step S40.

Step S40

The exposure control unit 30 judges the object is not in a back light or large luminance difference state, changes the photometry mode to the known centered weighted photometry or total average photometry, and decides on the exposure.

Step S50

Figure 7:
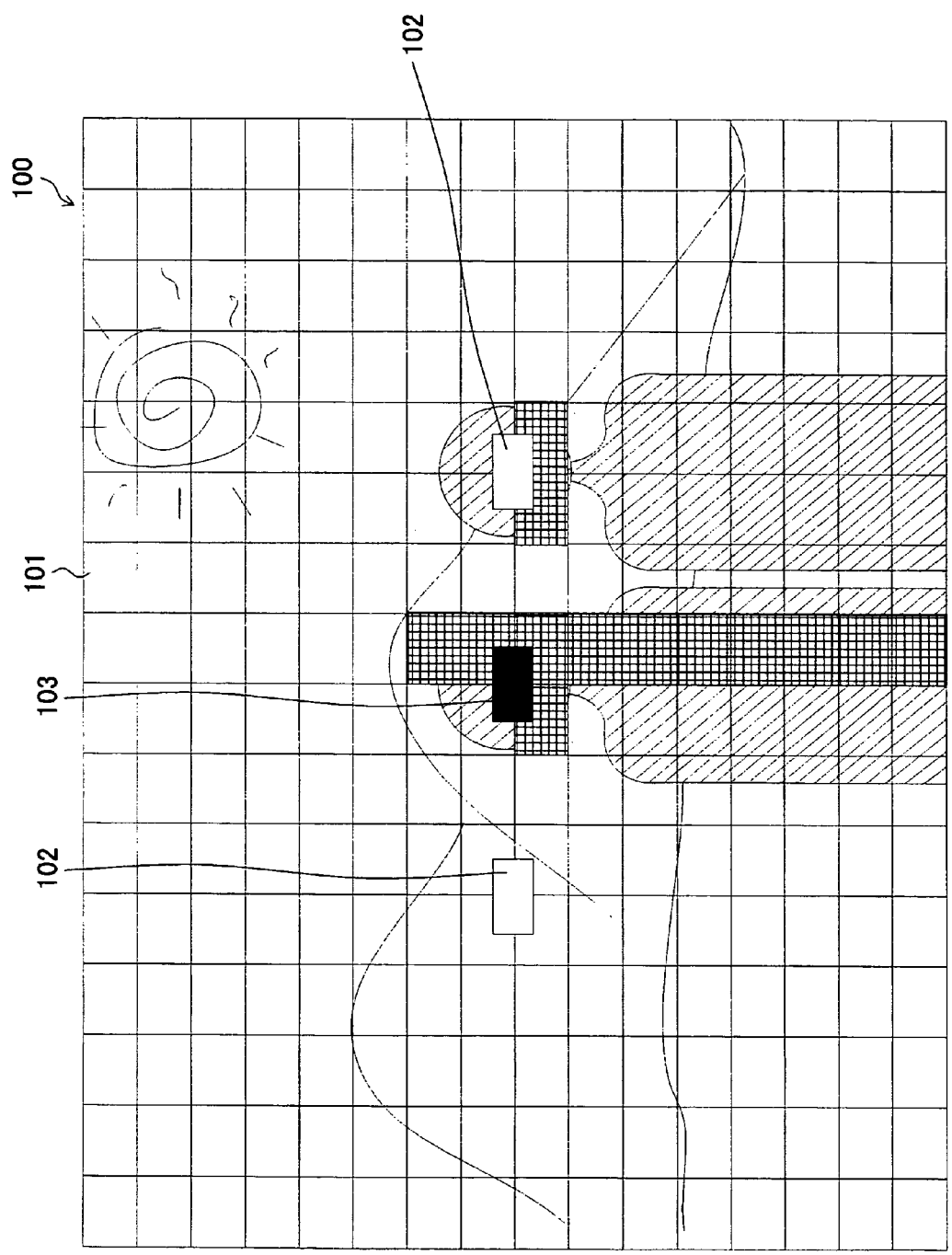
FIG. 7 is a view for explaining an example of the operation of an image capturing apparatus shown in FIG. 1 and shows an example of grouping regions with a large luminance difference.

The exposure control unit 30, as shown in FIG. 7, groups regions with a large luminance difference detected by the scan of the photometry regions of step S30 in the horizontal and vertical directions.

Step S60

The exposure control unit 30 judges if all of the grouped regions produced at step S50 are present on intersections of horizontal and vertical direction scan regions. When all of the grouped regions are present on intersections, the routine proceeds to step S100, while when not, the routine proceeds to step S70.

Step S70

The exposure control unit 30 judges if the scans of the photometry regions performed at step S20 have exceeded a prescribed number. When over the prescribed number of scans have already been performed, the routine proceeds to step S100, while when not, the routine proceeds to step S80.

Step S80

Figure 8:
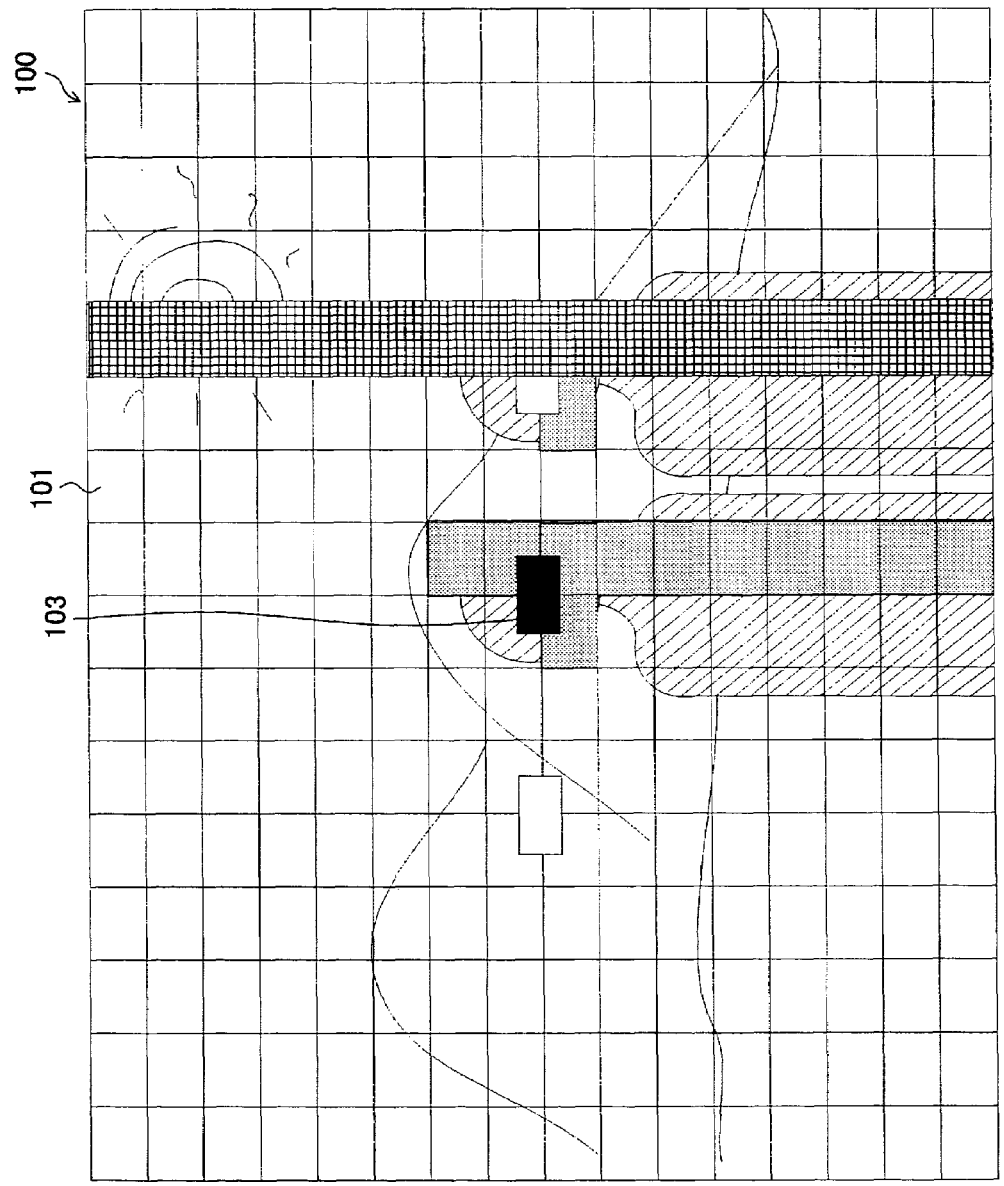
FIG. 8 is a view for explaining an example of the operation of an image capturing apparatus shown in FIG. 1 and shows an example of scanning the grouped regions in the vertical direction.
Figure 9:
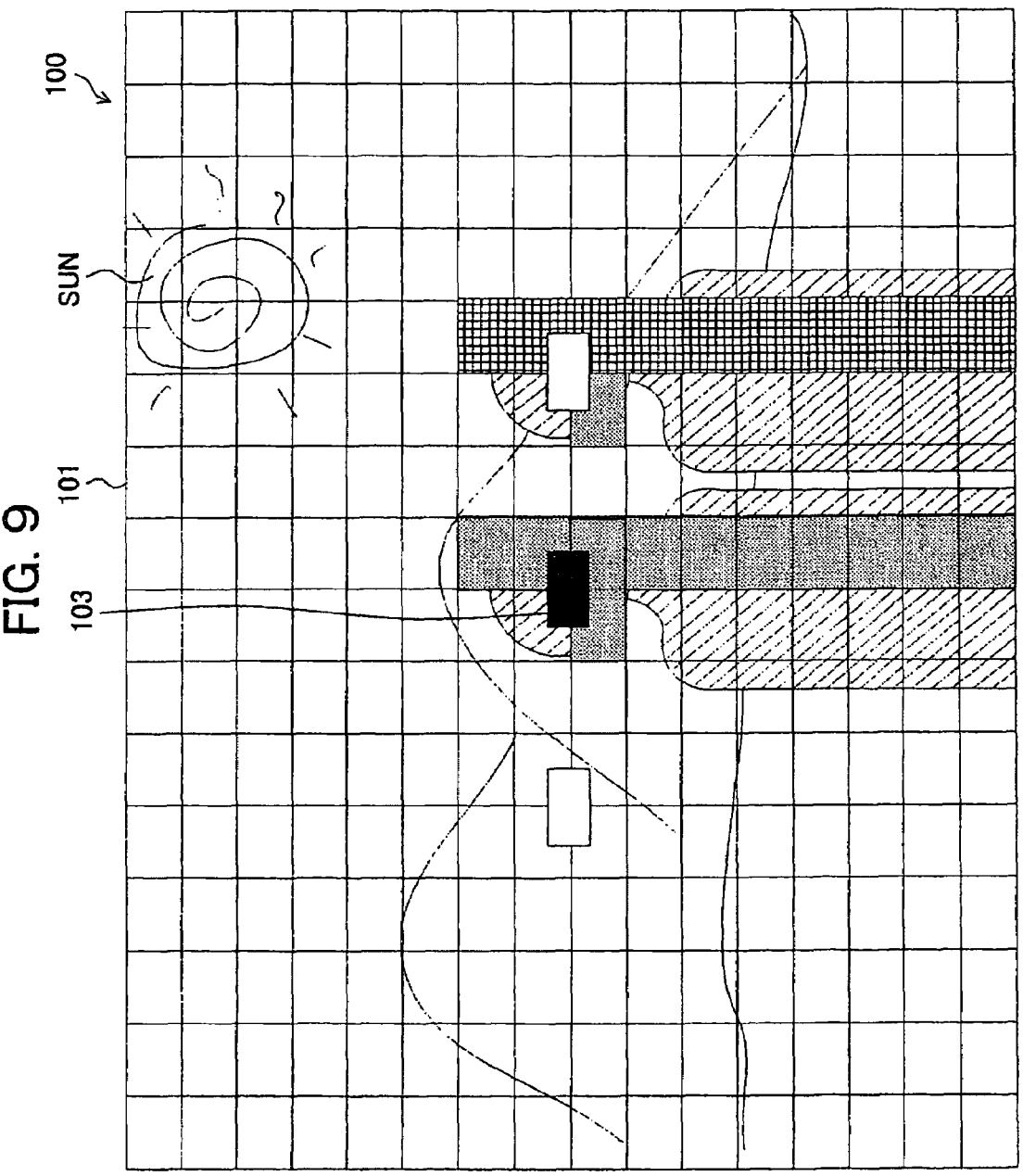
FIG. 9 is a view for explaining an example of the operation of an image capturing apparatus shown in FIG. 1 and shows an example of grouping regions with a luminance difference of a certain value or less in the vertical direction.

The exposure control unit 30, as shown in FIG. 8, scans the photometry regions in the vertical direction of grouped regions judged not to be present on intersections of photometry regions at step S60 and, as shown in FIG. 9, groups regions with a difference from the total average luminance of a certain value or more (for example, a luminance difference of 2 EV or more).

Step S90

Figure 10:
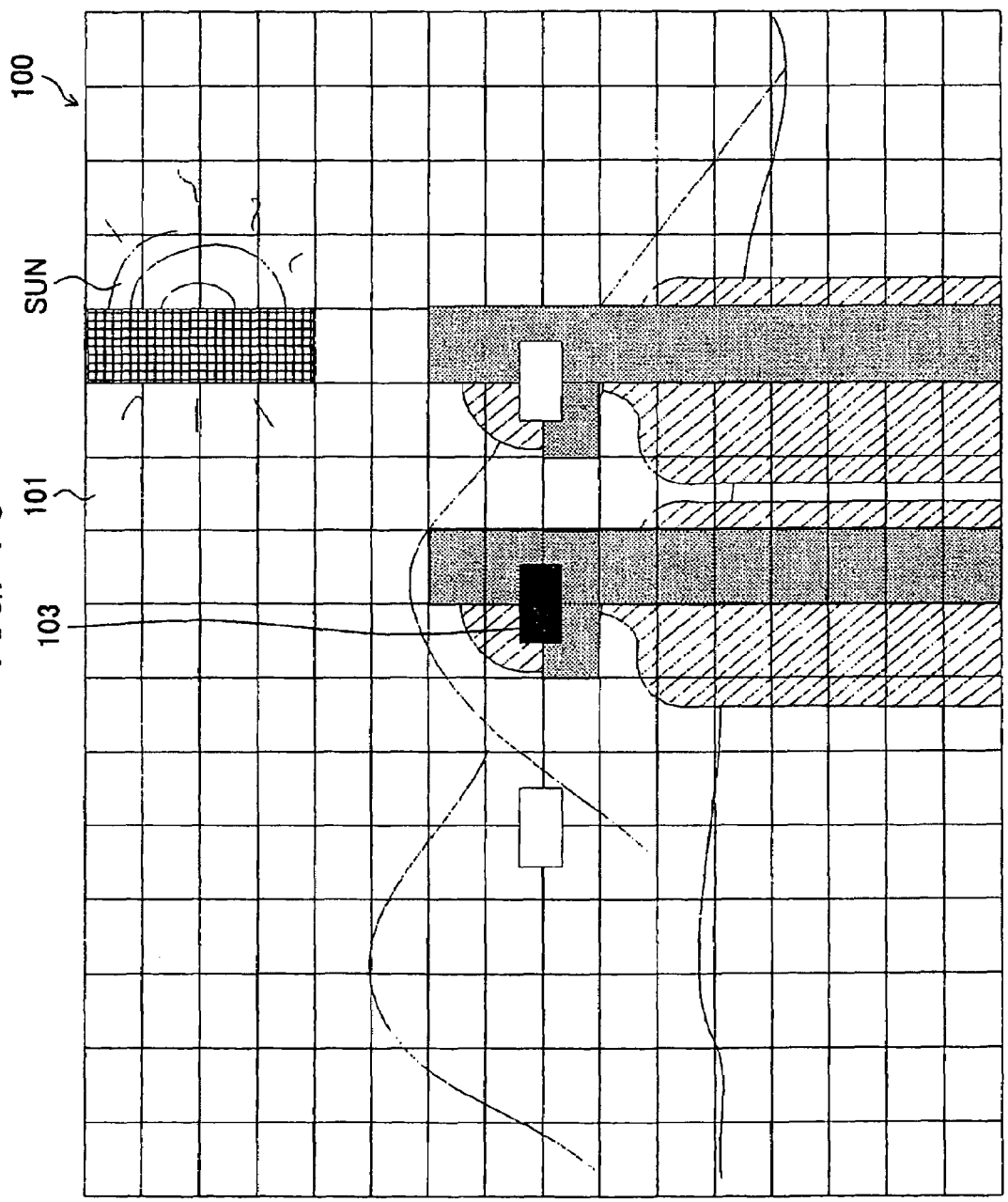
FIG. 10 is a view for explaining an example of the operation of an image capturing apparatus shown in FIG. 1 and shows an example of grouping newly detected regions with a luminance difference of a certain value or more.
Figure 11:
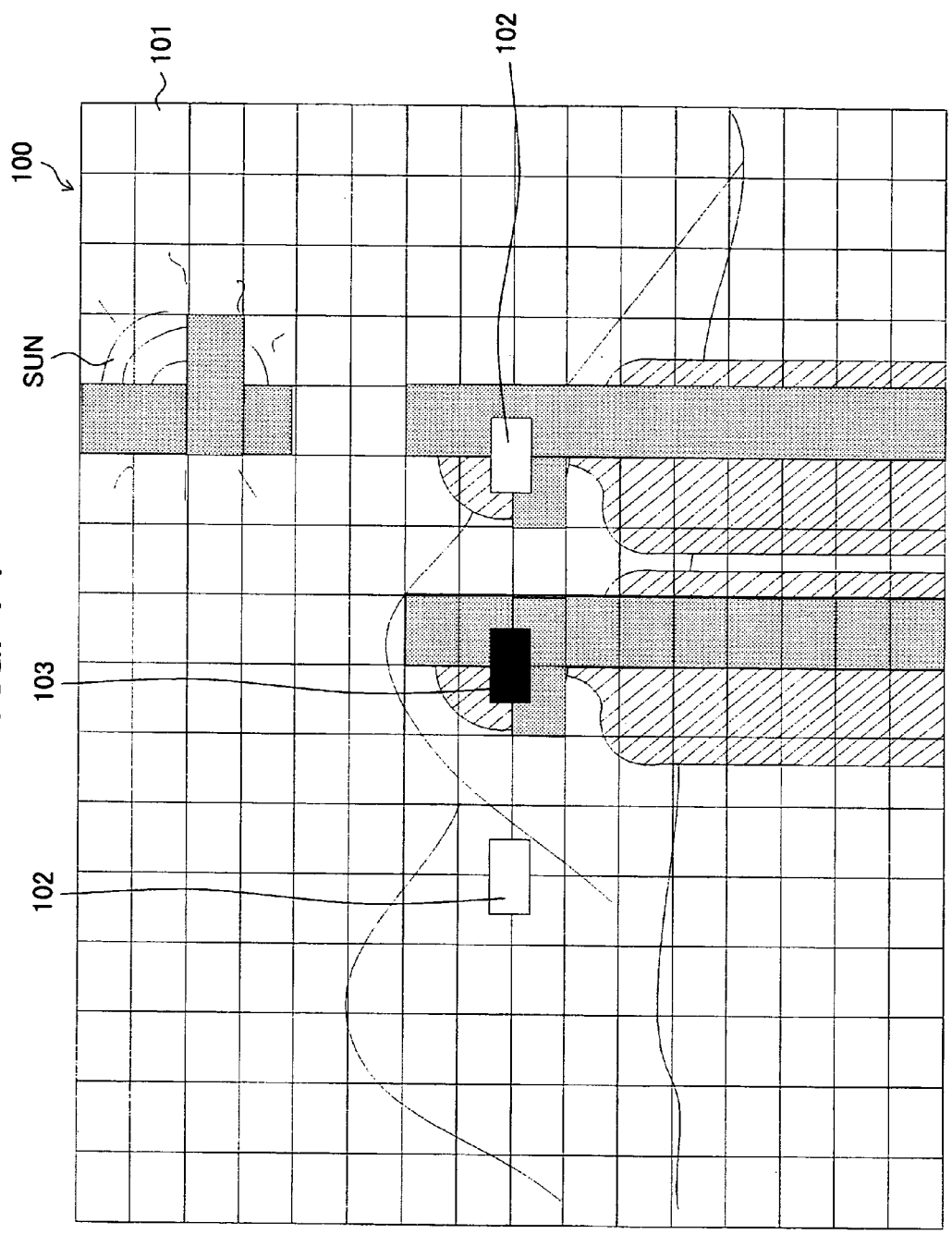
FIG. 11 is a view for explaining an example of the operation of an image capturing apparatus shown in FIG. 1 and shows results of photometry after repeatedly executing the processing of steps S50 to S90 of FIG. 2.

The exposure control unit 30 judges if there are any regions with a difference from the total average luminance of a certain value or more (for example, 2 EV or more) present other than the regions grouped at step S80 by the scan of the photometry regions performed at step S80. When it is judged that there are regions where the luminance difference is a certain value or more, the routine proceeds to step S50, where, as shown in FIG. 10, the regions are grouped, and then the same processing is repeated. When it is judged that there are no new regions with a luminance difference of a certain value or more, the routine proceeds to step S100. Note that in the embodiments, regions with the sun are also detected as regions with a luminance difference of a certain value or more, so in the end, at step S100, the photometry results such as shown in FIG. 11 are output.

Step S100

Figure 12:
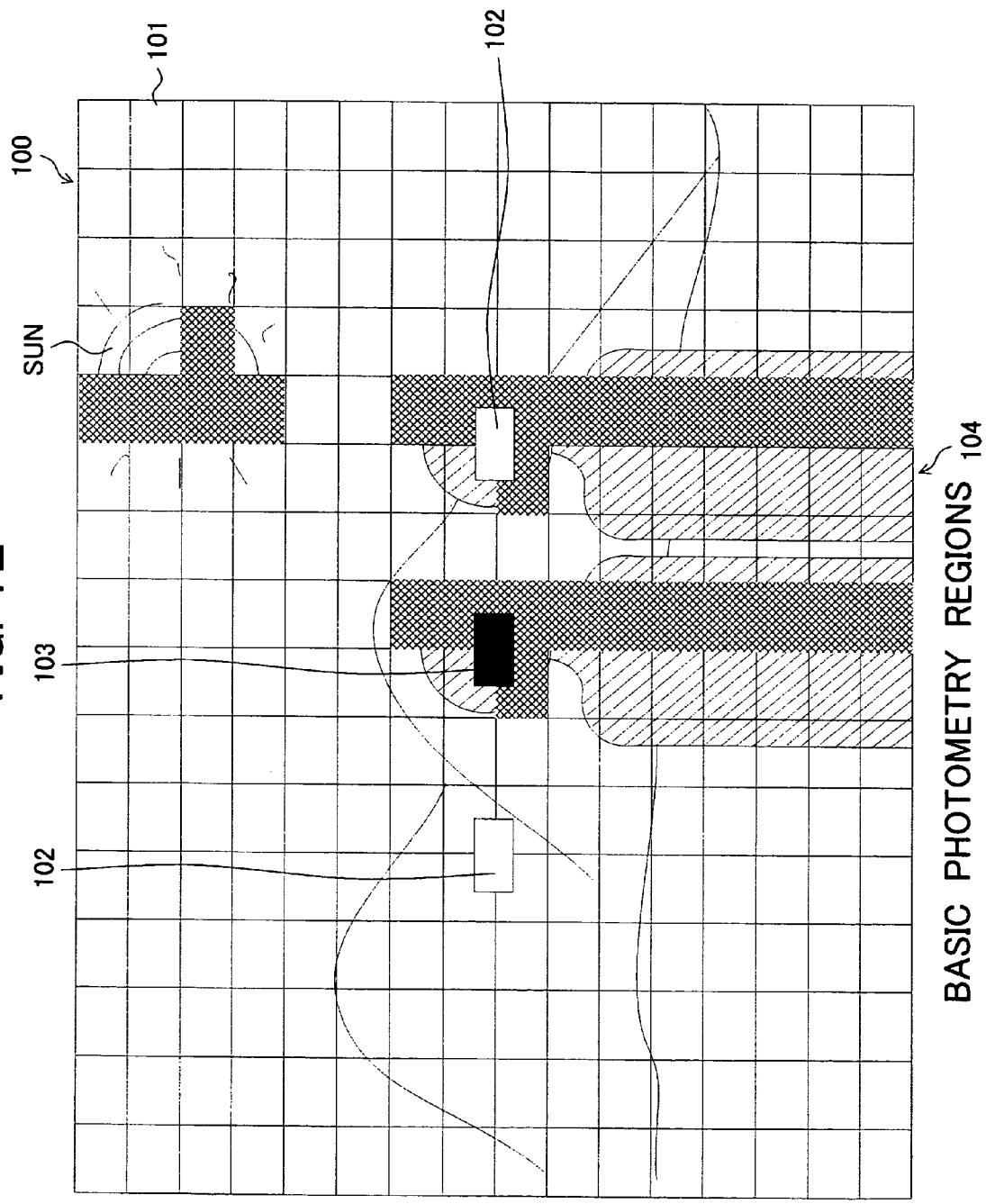
FIG. 12 is a view for explaining an example of the operation of an image capturing apparatus shown in FIG. 1 and shows basic photometry regions.

The exposure control unit 30 combines the mutually intersecting regions among the grouped regions obtained as a result of execution of step S50 to step S90 to prepare basic photometry regions 104, as shown in FIG. 12.

Step S110

Figure 13:
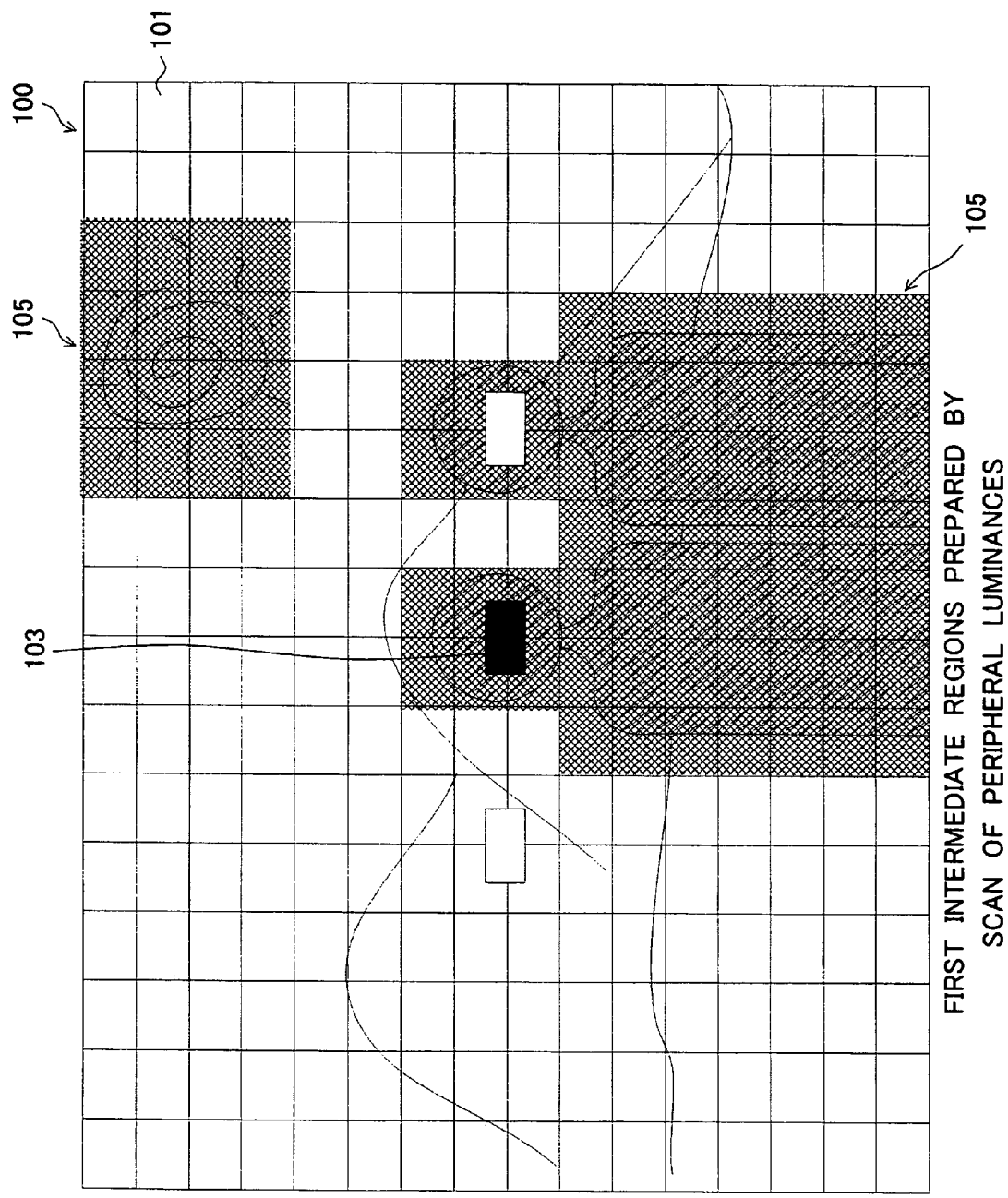
FIG. 13 is a view for explaining an example of the operation of an image capturing apparatus shown in FIG. 1 and shows an example of first intermediate regions prepared by a scan of peripheral luminances.
Figure 14:
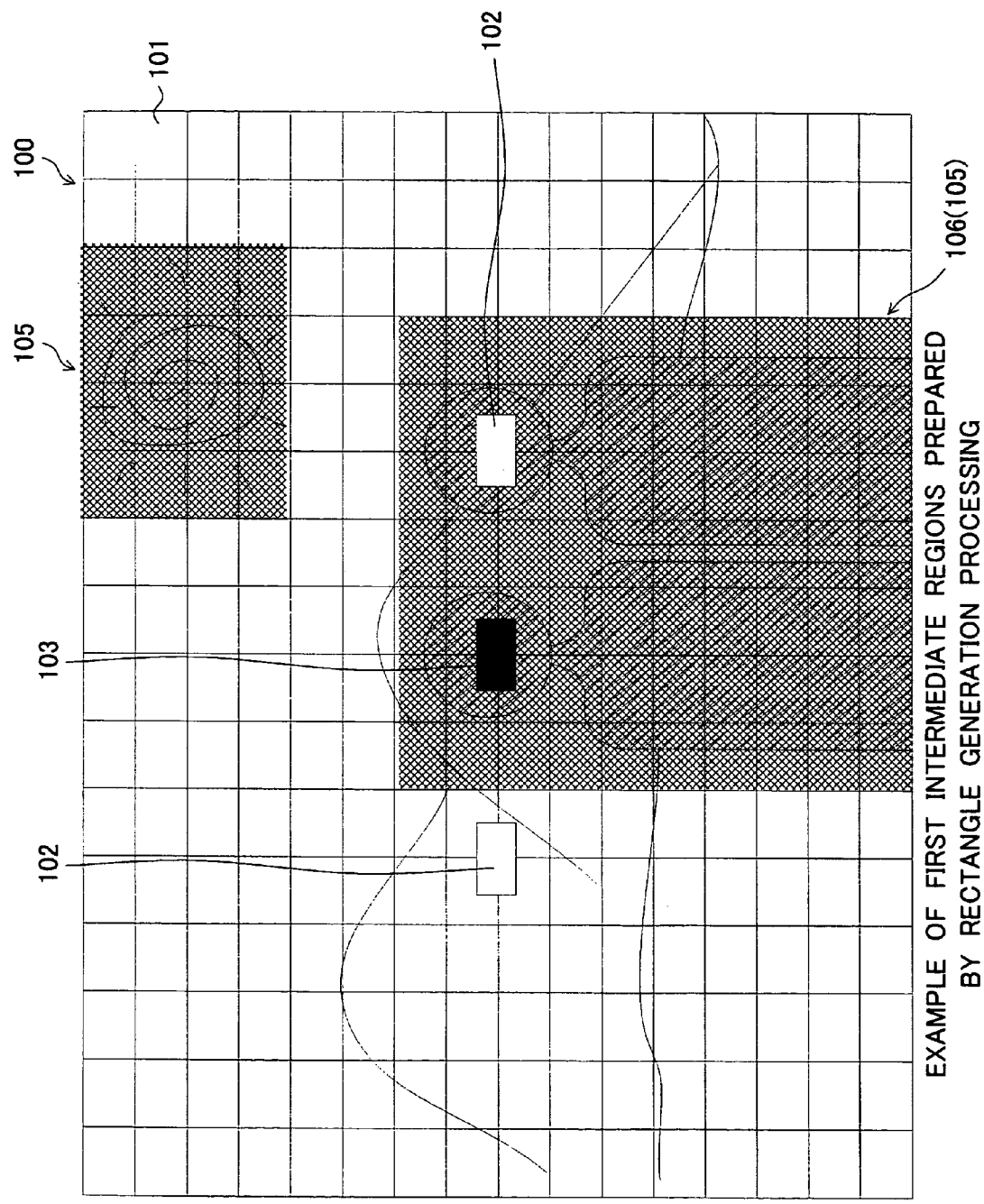
FIG. 14 is a view for explaining an example of the operation of an image capturing apparatus shown in FIG. 1 and shows an example of first intermediate regions prepared by rectangle generation processing.

The exposure control unit 30 checks the luminances of the photometry regions around the basic photometry regions prepared at basic step S100 and adds the regions with a close luminance to the basic photometry regions 104 to prepare first intermediate regions 105. The photometry regions added may be selected, for example, as shown in FIG. 13, as the regions with a luminance difference from the basic photometry regions of a certain value or less (for example 1 EV or less) or as a rectangular region 106 encompassing the basic photometry regions 105 for simplification of the processing, as shown in FIG. 14.

Step S120

The exposure control unit 30 judges if the average luminance value of each first intermediate region prepared at step S110 is higher than the total average luminance value. When a first intermediate region is judged to be a high luminance region, the region judged to be a high luminance is processed as shown in step S130. When a first intermediate region is judged to be a low luminance region, the region judged to be a low luminance is processed as shown in step S140.

Step S130

The exposure control unit 30 performs high luminance region processing on a first intermediate region judged as a high luminance at step S120. The "high luminance region processing" referred to here means processing to reduce the effect of the region luminance on the exposure value and is, for example, processing for preventing the sun or another light source from causing the exposure value to be biased to the under direction. As this processing, for example, the average luminance value of the intermediate region may be replaced by a predetermined certain value or the weighting value of the intermediate region may be replaced with a predetermined certain value. Further, it is also possible to give a weighting value in accordance with the distance of the intermediate region from the observation point in the object field or possible to perform processing for removing the intermediate region from the scope of the photometry operation in the exposure determination. After the above processing ends, the routine proceeds to step S190.

Step S140

Figure 15:
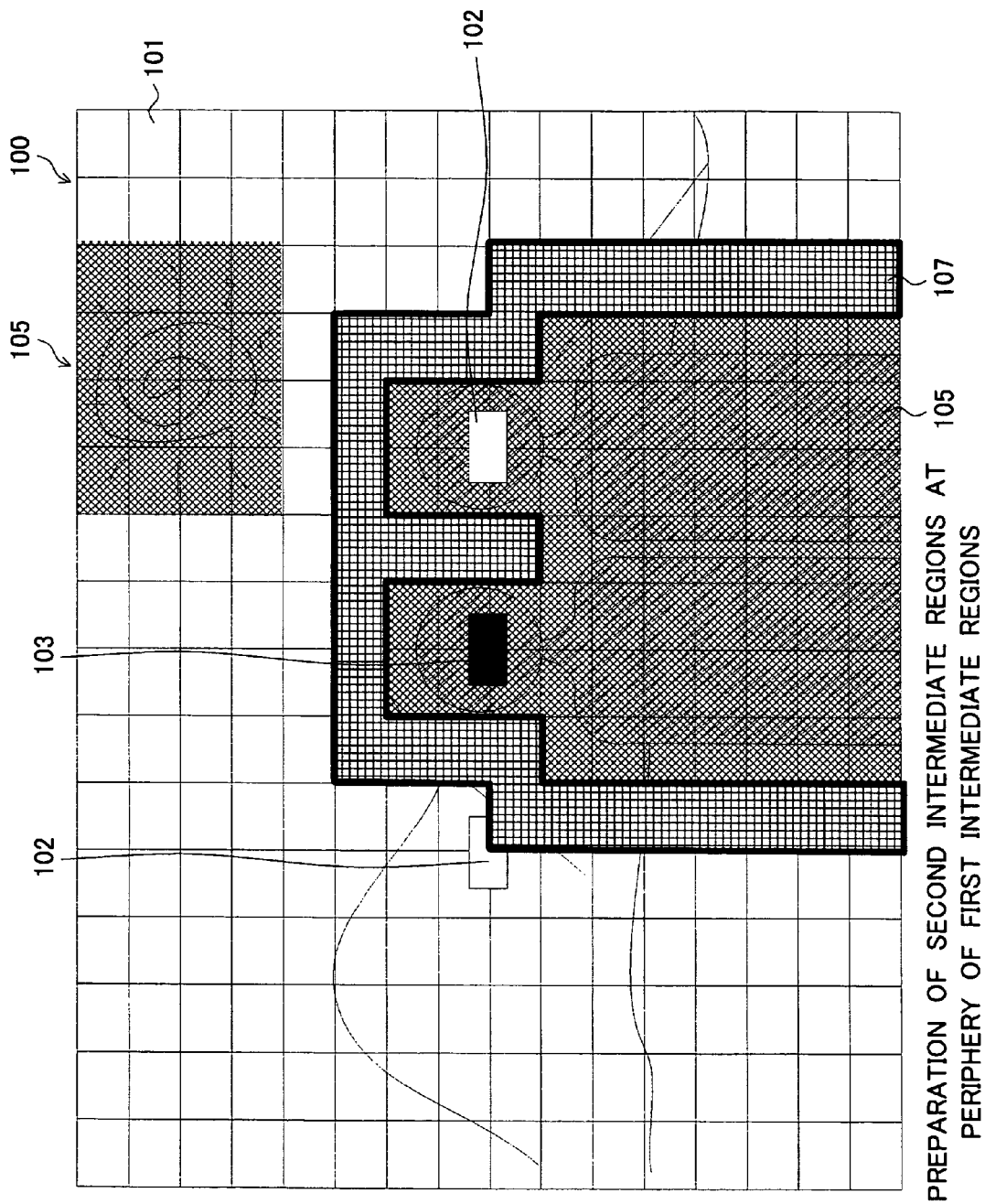
FIG. 15 is a view for explaining an example of the operation of an image capturing apparatus shown in FIG. 1 and shows an example of preparing second intermediate regions at the periphery of the first intermediate regions.

The exposure control unit 30 groups the photometry regions surrounding the first intermediate regions judged as low luminance at step S120, as shown in FIG. 15, to prepare second intermediate regions 107. As the method of preparation, for example, it is possible to cover regions within a certain value (for example, within 2 EV) of the first intermediate regions 105 or to cover photometry regions of certain peripheries of the first intermediate regions 105 (for example, two columns).

Step S150

The exposure control unit 30 calculates the difference of the average luminance values of the first intermediate regions prepared at step S110 and the second intermediate regions prepared at their periphery at step S140.

Step S160

Figure 16:
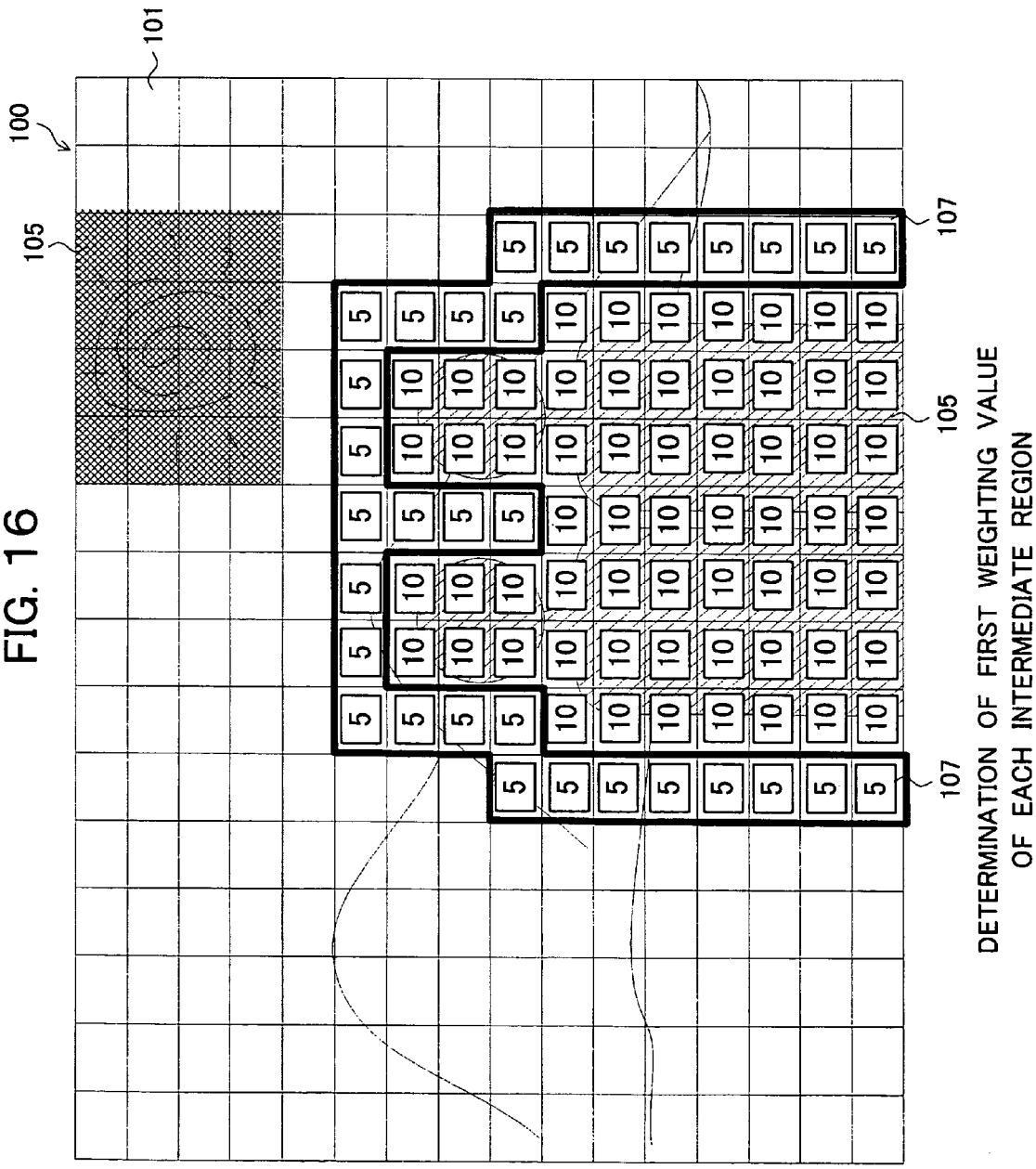
FIG. 16 is a view for explaining an example of the operation of an image capturing apparatus shown in FIG. 1 and shows an example of the determination of the first weighting value of each intermediate region.

The exposure control unit 30 uses the average luminance difference of the first intermediate regions and second intermediate regions calculated at step S150 to determine the first weighting value of the regions as shown in, for example, FIG. 16. For example, when the average luminance difference of the first intermediate regions 105 and second intermediate regions 107 is large, it is judged that the object of the intermediate regions is in a strong back light state and increases the weighting of the first intermediate regions 105. Further, it is also possible to utilize the area occupied by the first intermediate regions 105 in the object field or the area ratio of the first intermediate regions 105 and second intermediate regions 107 at the time of the weighting.

Step S170

Figure 17:
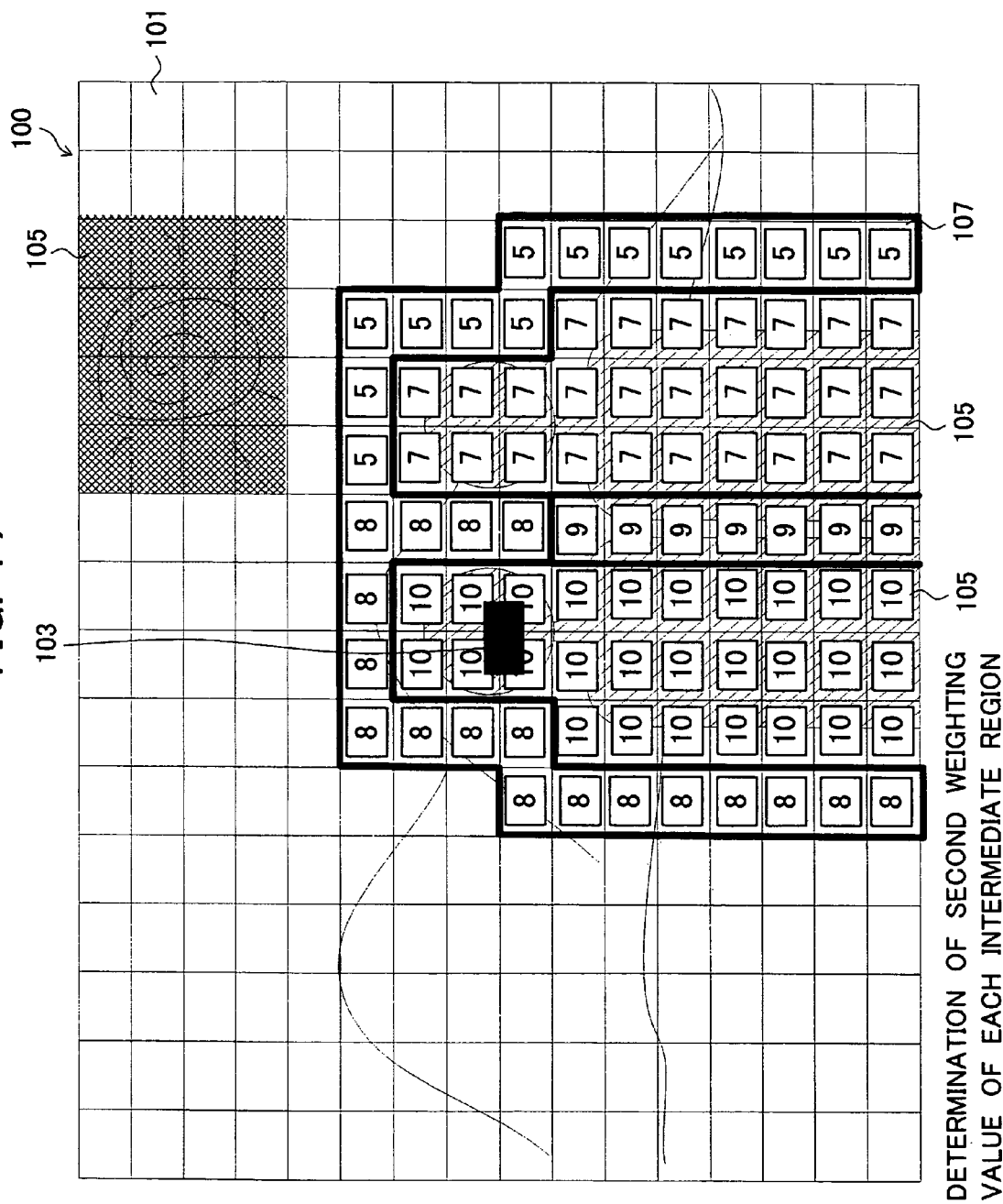
FIG. 17 is a view for explaining an example of the operation of an image capturing apparatus shown in FIG. 1 and shows an example of the determination of the second weighting value of each intermediate region.

The exposure control unit 30 determines the second weighting value, for example, as shown in FIG. 17, from the positions of the first intermediate regions 105 and second intermediate regions 107 calculated at step S150. This may be done, for example, by utilizing the distance of the intermediate regions from the observation point in the object field (for example, increasing the weighting for regions close to the observation point and reducing the weighting for regions far from it) or, when the distances of the observation point and the intermediate regions from the main object are known, utilizing the difference between the distance from the observation point to the main object and the distance from the intermediate regions to the object for the weighting (for example, when the distance is substantially the same as the distance from the observation point to the object, increasing the weighting, and when the distance is further, reducing the weighting). Further, in a region where a plurality of intermediate regions overlap, the average value of the second weighting values of the intermediate regions may be made the second weighting value of the region.

Step S180

The exposure control unit 30 calculates the weighted small region luminance values from the first and second weighting values determined at step S160 and step S170 and the individual small region luminance values.

Step S190

The exposure control unit 30 calculates the average value of the weighted luminance values of all small regions calculated at step S180 and calculates the final evaluation value. Using the above calculated final evaluation value, the exposure control unit 30 controls the iris 12, the shutter 13, and the A/D conversion circuit 16 to capture an image and outputs the captured image to the image processing unit 70. The image processing unit 70 performs, for example, white balance and γ curve correction and other processing to generate image data and outputs it to the image storage unit 80.

The image storage unit 80 writes the image data IM input from the image combining unit 60 into the memory 90.

In the above way, the image capturing apparatus 1, as shown in FIG. 5, divides the object field for photometry and capturing the image. At that time, it confirms the change in luminance in the horizontal and vertical directions to confirm the state of the object, so, for example, even when the main object is in the back light state, image capture with a suitable exposure becomes possible. Further, even when the object field contains a light source or other high luminance object, it becomes possible to detect the regions and change the weighting, etc. to reduce the possibility of taking a photograph with insufficient exposure.

Next, the image capturing apparatus according to second embodiment of the present invention will be explained.

Figure 18:
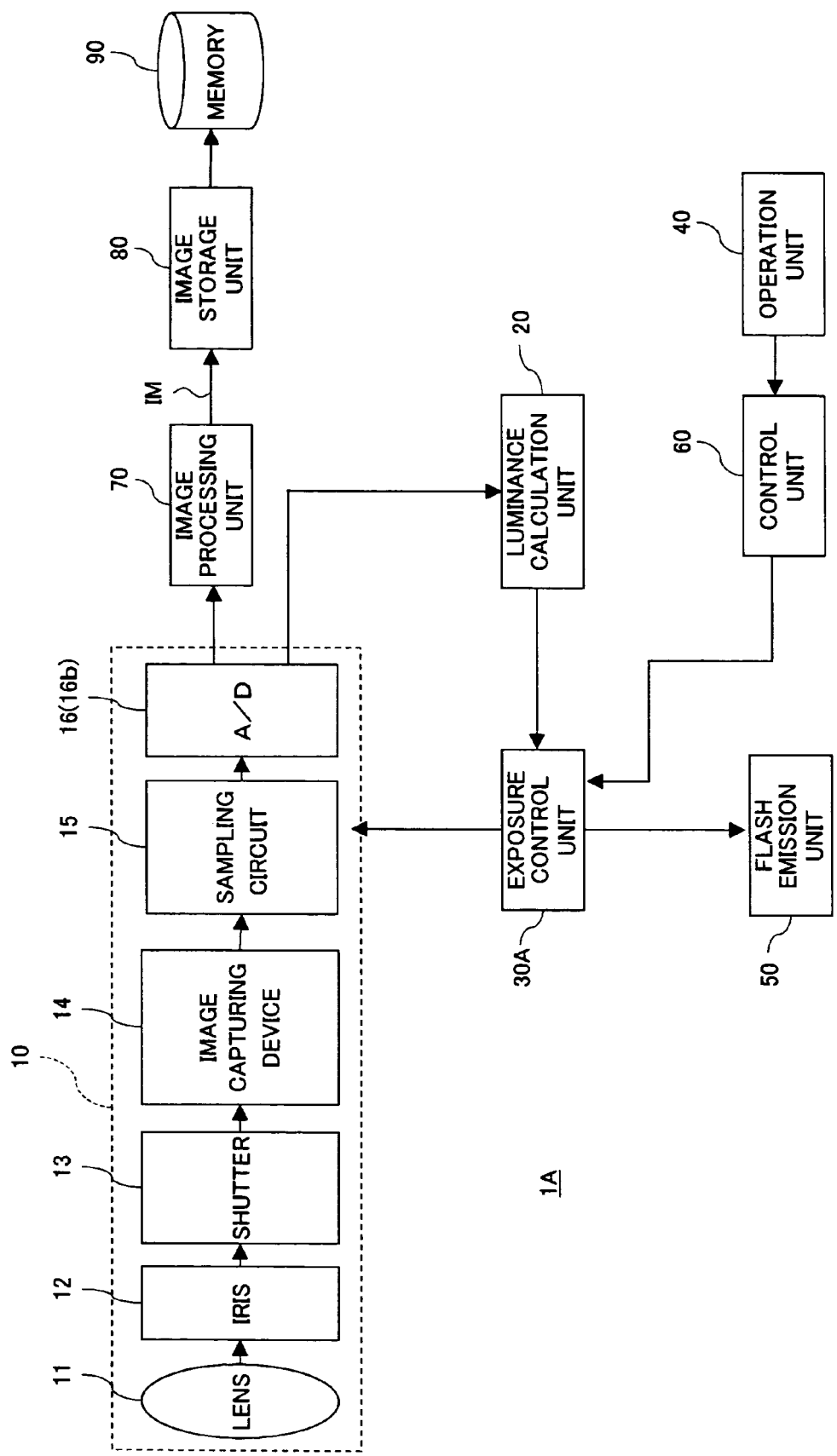
FIG. 18 is a view of the overall configuration of an image capturing apparatus according to a second embodiment of the present invention.

FIG. 18 is a view of the overall configuration of an image capturing apparatus according to the second embodiment of the present invention. The image capturing apparatus 1A according to the second embodiment differs from the image capturing apparatus 1 according to the first embodiment in the point of the processing of the exposure control unit 30A.

The exposure control unit 30A of the second embodiment, as will be explained in detail later, has a grouping function of producing a plurality of intermediate regions from the object luminances output from the luminance calculation unit 20, an evaluation value calculation function of producing exposure evaluation values from the intermediate region luminances, and a control function for image capture by a suitable exposure in accordance with the calculated luminances.

In this embodiment, the grouping function divides the object luminance information output from the luminance calculation unit 20 into a plurality of first intermediate regions, scans first intermediate regions with luminance differences from the total average luminance of a certain value or more or one or more first intermediate regions designated by the image capture mode, user settings, etc. in the horizontal and vertical directions to confirm the luminance difference with the total average luminance, and groups regions with a luminance difference of a certain value or more as second intermediate regions. Further, the grouping function searches for the luminance of the periphery of a generated second intermediate region and groups regions meeting predetermined conditions as a third intermediate region.

Further, the evaluation value calculation function of the exposure control unit 30A gives a first weighting value to each photometry region in accordance with the luminance difference between the generated second intermediate regions and third intermediate regions. Further, the evaluation value calculation function gives a second weighting value to each generated first intermediate region. This second weighting value generating function can determine the weighting value in accordance with the distance from the screen center, the distance from the measurement point, the object distance at each region, the face detection region, the distance from the first intermediate region designated by the user, or a combination of the plurality of means. Further, the evaluation value calculation function calculates the weighted object luminance obtained by weighting the object luminance measured by the photometry unit in accordance with the weighting value.

Figure 19B:
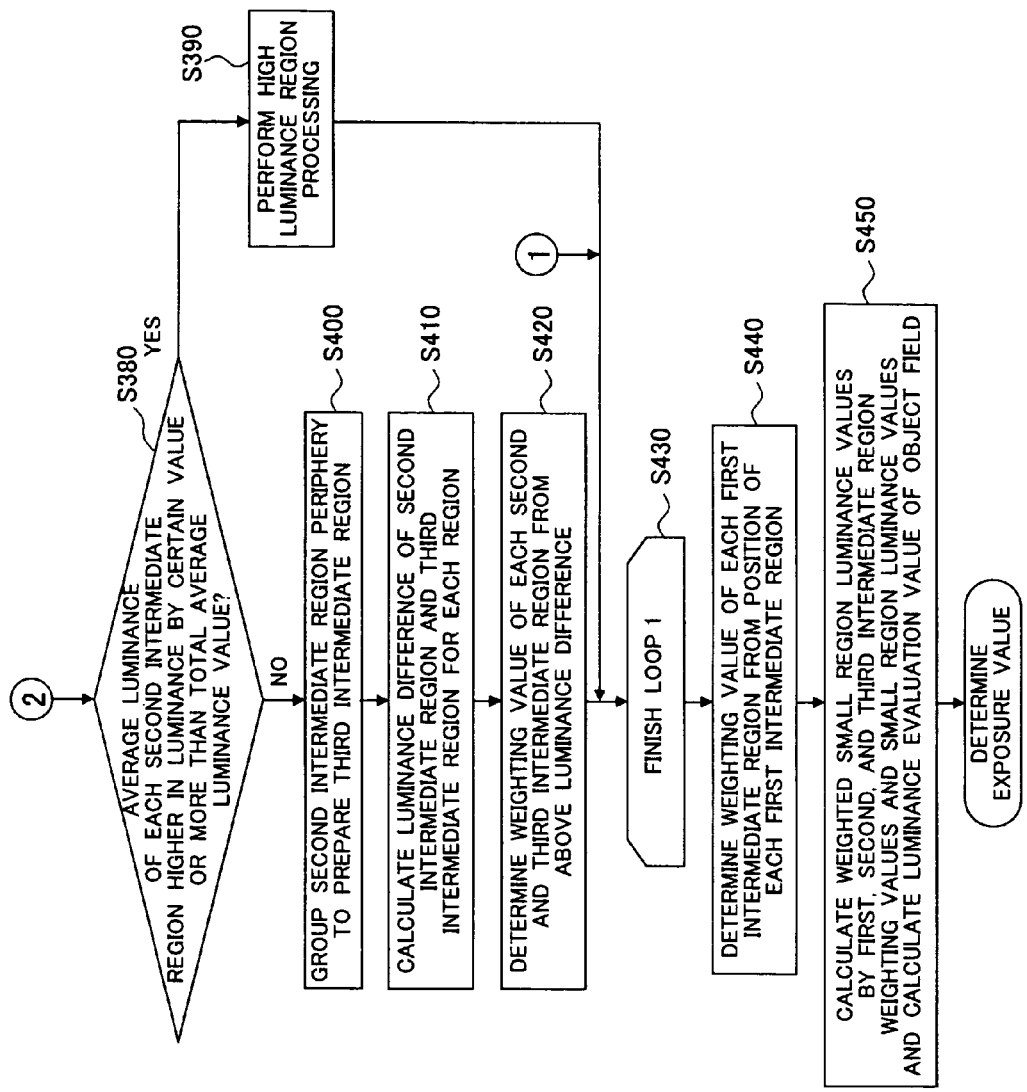

Below, an example of the operation of the image capturing apparatus shown in FIG. 18 will be explained by focusing on the exposure control unit 30A with reference to FIG. 19A to FIG. 41. FIGS. 19A and 19B are flow charts for explaining an example of the operation of the image capturing apparatus shown in FIG. 18.

Step S210

Figure 21:
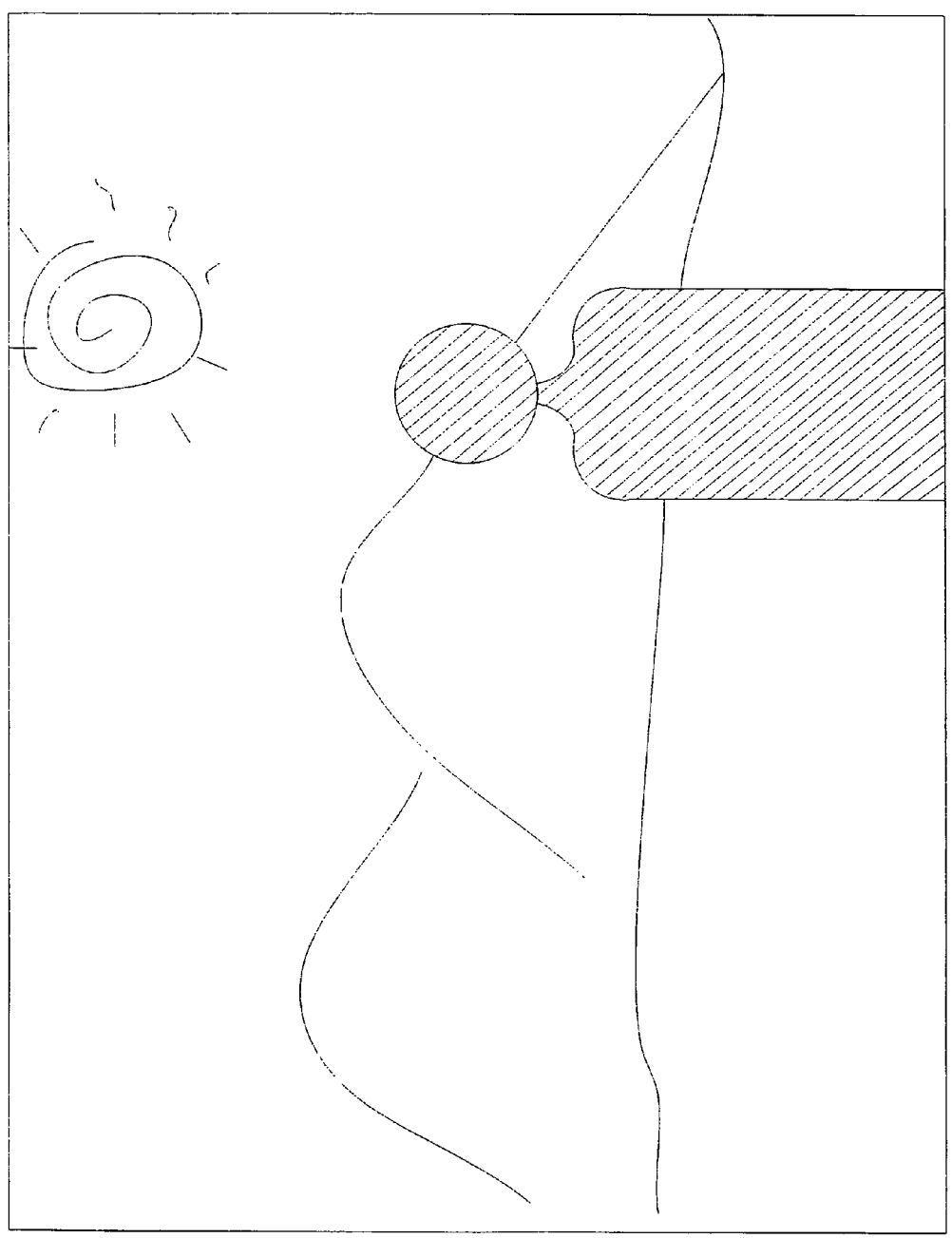
FIG. 21 is a view for explaining an example of the operation of an image capturing apparatus shown in FIG. 18 and shows an example of a portrait photo with scenery in the background taken under back light.
Figure 22:
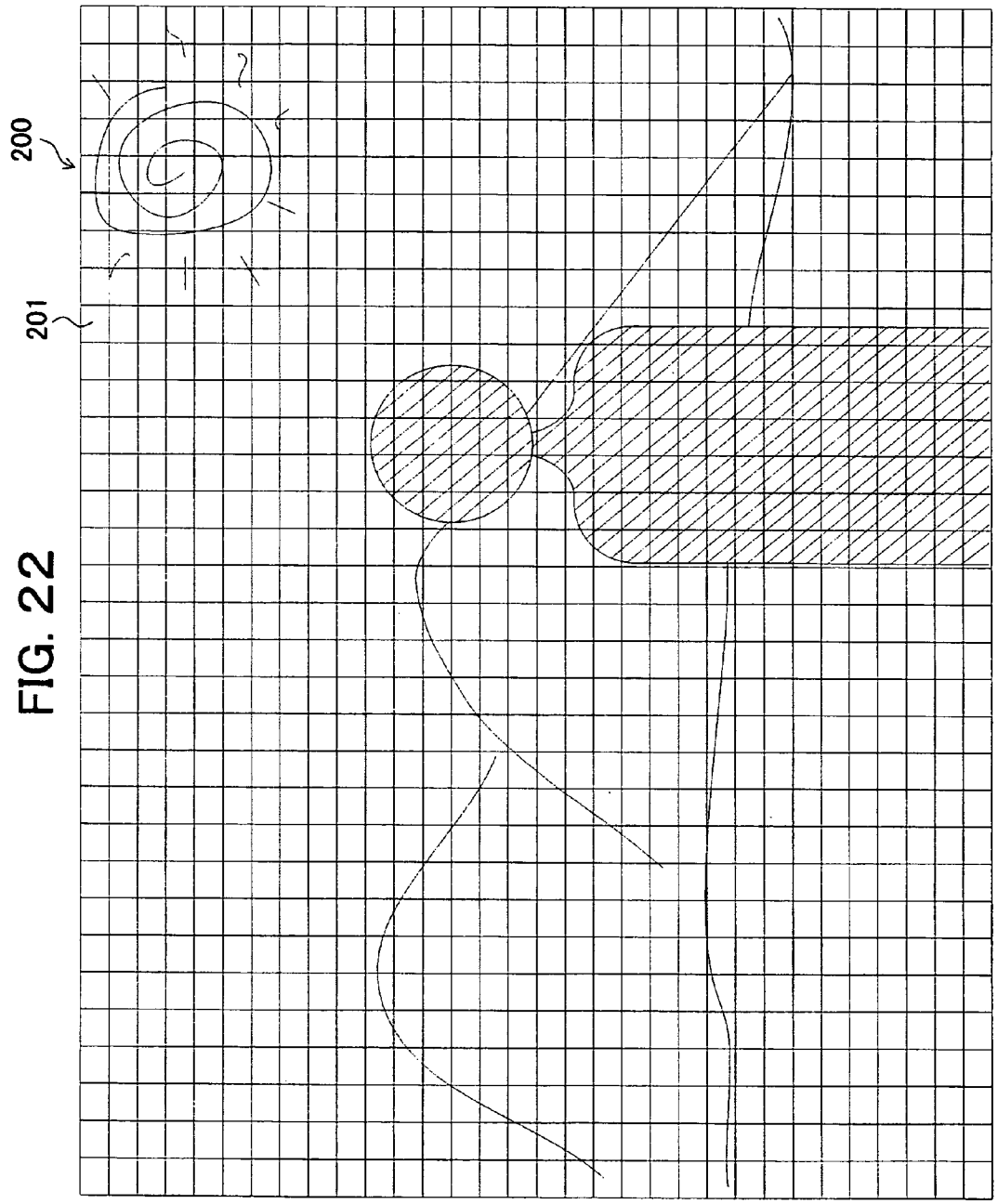
FIG. 22 is a view for explaining an example of the operation of an image capturing apparatus shown in FIG. 18 and shows an example of divided photometry of the object shown in FIG. 21.

The luminance calculation unit 20, based on the exposure control mode or photometry mode set by the user at the operation unit 40 in the exposure control unit 30A, divides the image captured by the camera module 10, for example, as shown in FIG. 20, a photometry frame region 200 forming a predetermined rectangle, into a plurality of small regions 201 and calculates the cumulative luminance value of each of the small regions 201. In the present embodiment, considering the convenience in explanation, the example was shown of measuring light divided into 32×32 or 1024 small regions, but the number of division is just one example. The invention is not limited to 1024 regions. For example, when taking the photograph such as the one shown in FIG. 21, the object field is divided into the small regions as shown in FIG. 22 for the measurement of light. The cumulative luminance value of each small region 201 obtained by the photometry is output to the exposure control unit 30A.

Step S220

Figure 23:
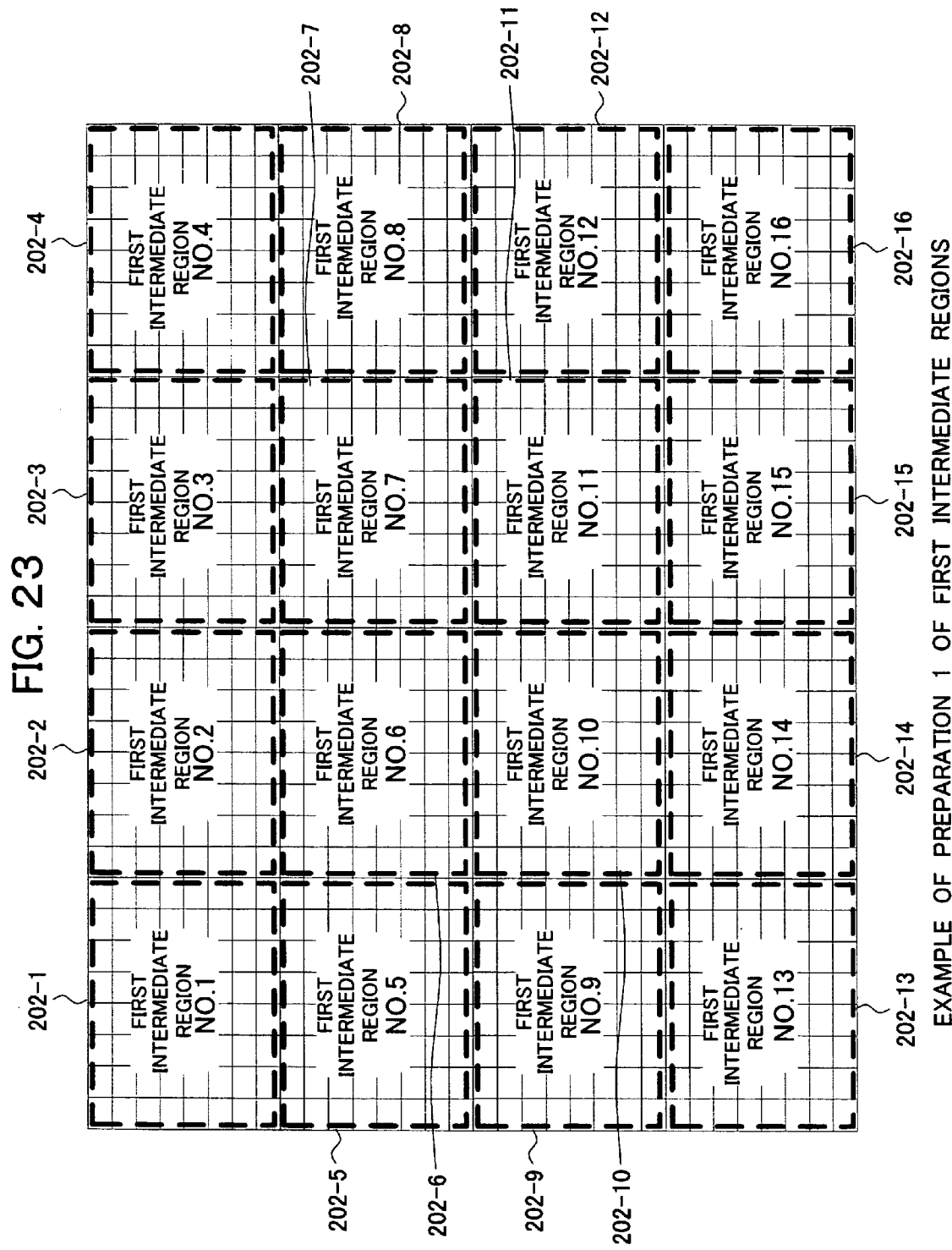
FIG. 23 is a view for explaining an example of the operation of an image capturing apparatus shown in FIG. 18 and shows an example of the preparation of first intermediate regions.
Figure 24:
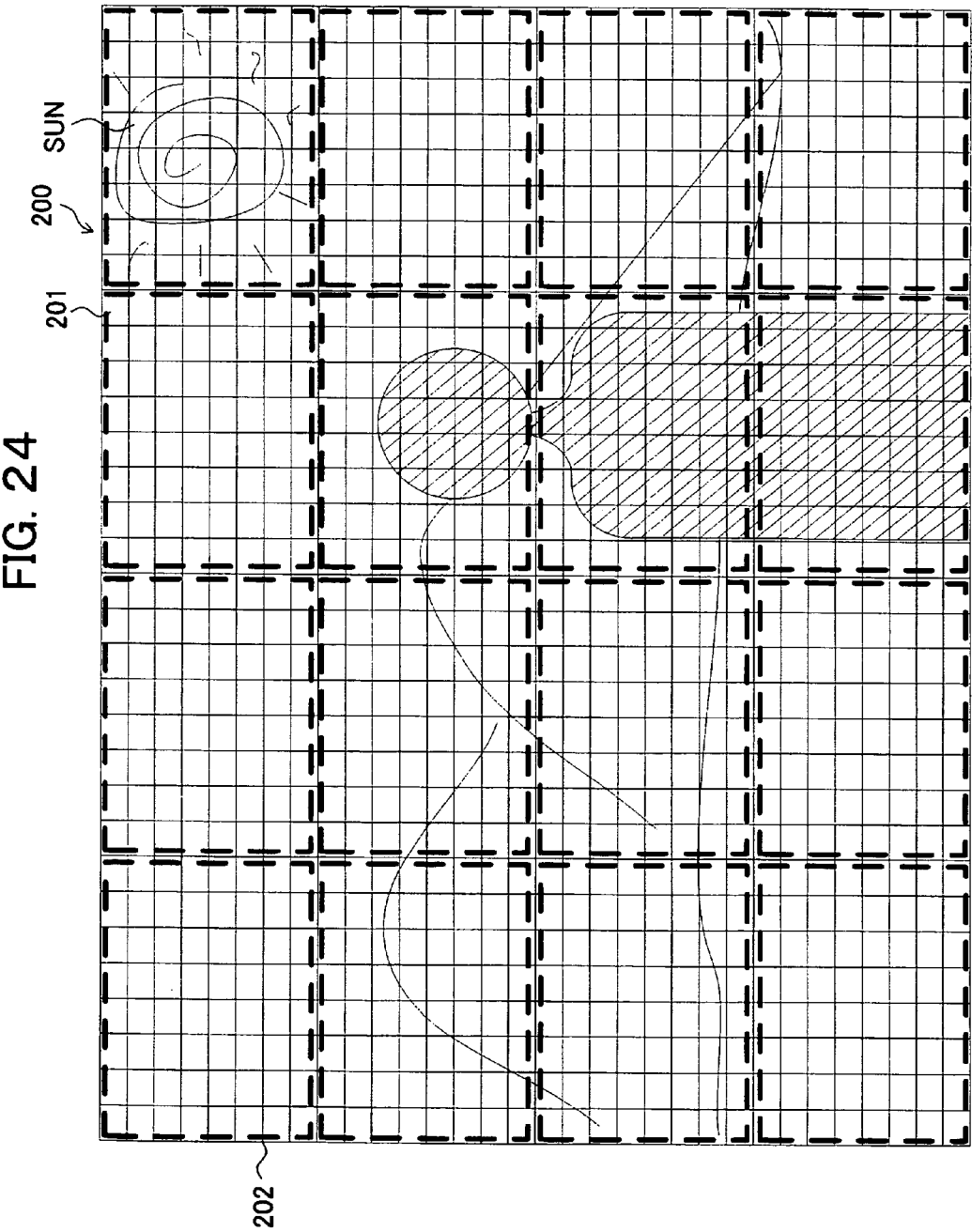
FIG. 24 is a view for explaining an example of the operation of an image capturing apparatus shown in FIG. 18 and shows an example of grouping the object shown in FIG. 21 into intermediate regions.
Figure 25:
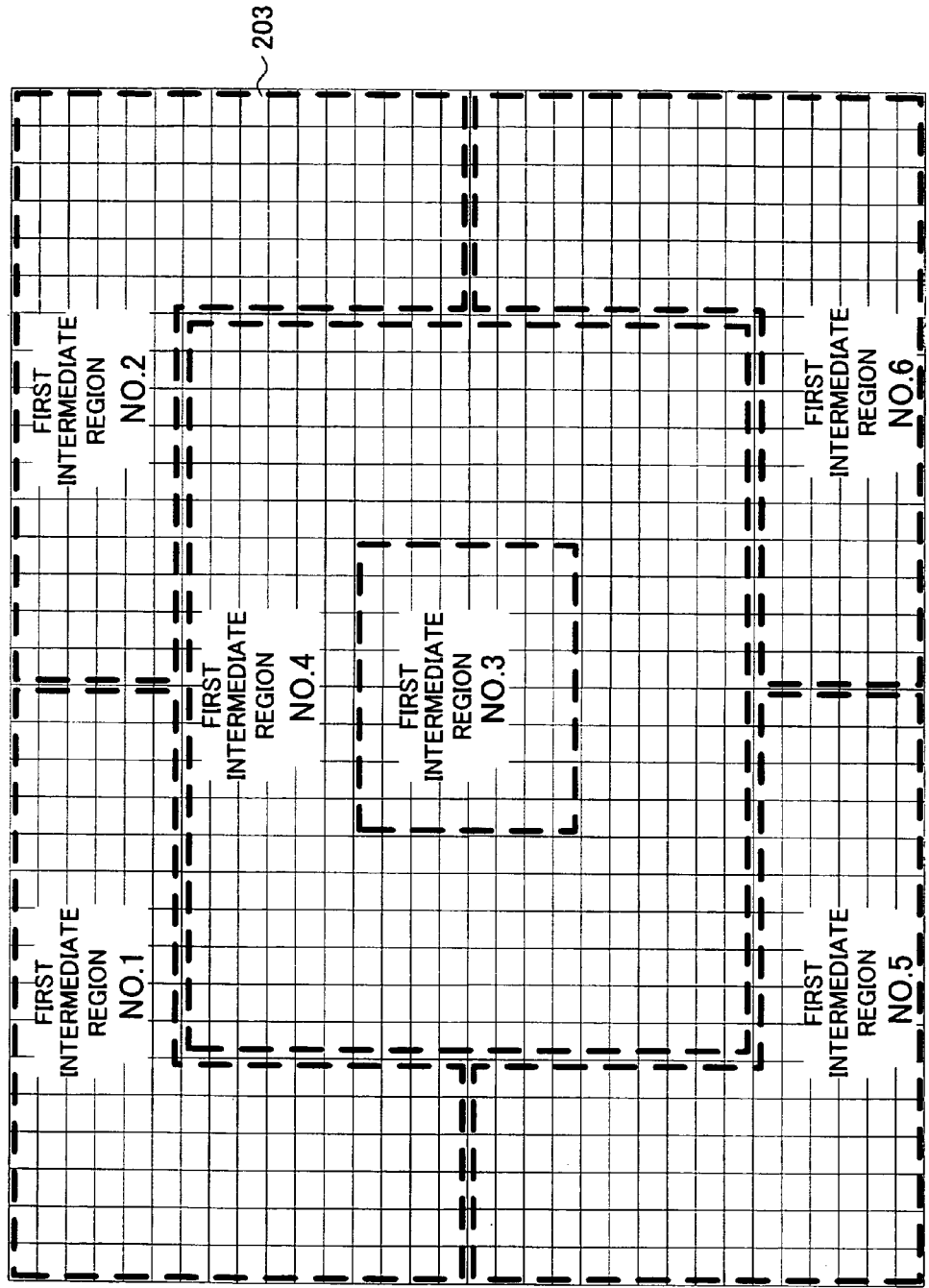
FIG. 25 is a view for explaining an example of operation of an image capturing apparatus shown in FIG. 18 and shows another example of the preparation of first intermediate regions.

The exposure control unit 30A groups the small regions output from the luminance calculation unit 20 to a plurality of first intermediate regions 202-1 to 202-16, for example, as shown in FIG. 23, and calculates the average luminance value of each of the first intermediate regions 202. If performing this processing on the photograph shown, for example, in FIG. 21, the object field is divided into the intermediate regions 202 as shown in FIG. 24 and their average luminances are calculated. Note that in the present embodiment, considering the convenience in the explanation, the example of dividing the field into 4×4 or 16 intermediate regions 202 to calculate the luminance was shown, but the number of division is just one example. The invention is not limited to 16 regions. Further, the invention is not limited in the shape or arrangement of the first intermediate regions either. For example, as shown in FIG. 25, differently shaped intermediate regions 203 may be arranged overlappingly. Further, it is also possible to arrange the same intermediate regions at only part of the object field, for example, at only the center.

Step S230

The exposure control unit 30A compares the average luminance value of each first intermediate region 202 calculated at step S220 and the average luminance value of the object field as a whole and judges if there is any first intermediate region with a luminance difference of a certain value or more (for example, 2 EV or more). When judging that there is any region where the luminance difference is a certain value or more, the routine proceeds to step S250, while when judging that there is not, the routine proceeds to step S240. Further, even when the difference from the average luminance value of the entire surface is within a certain value, for example, when there is a first intermediate region designated for scanning in advance by the exposure control mode or a user setting from the operation unit 40, the routine proceeds to step S250.

Step S240

The exposure control unit 30A judges if the object is in a state of a back light or large luminance difference, changes the photometry mode to the known centered weighted photometry or total average photometry or other photometry mode, and determines the exposure.

Step S250

Figure 26:
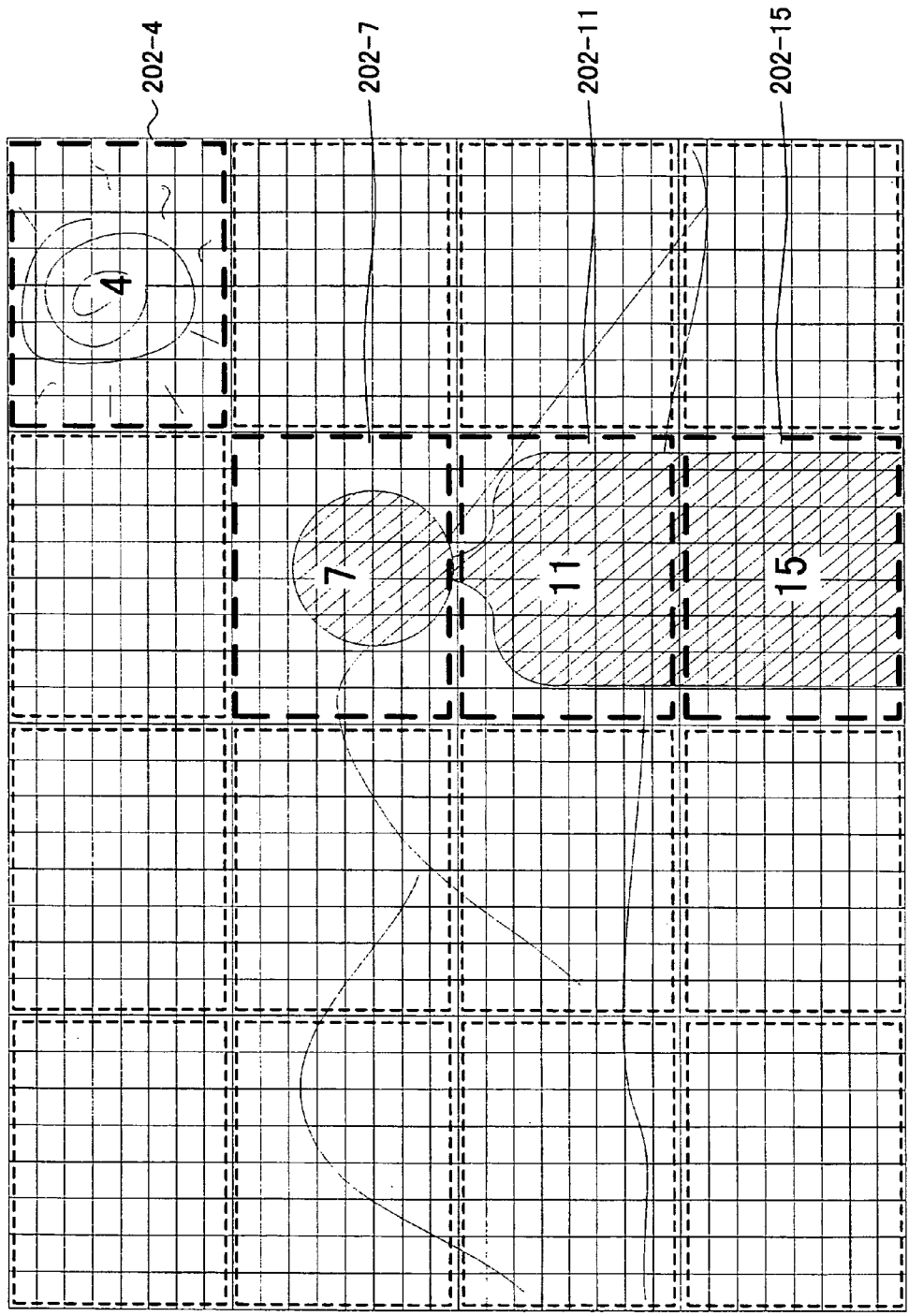
FIG. 26 is a view for explaining an example of the operation of an image capturing apparatus shown in FIG. 18 and shows an example of regions with a luminance difference from an average luminance of a certain value or more.

The exposure control unit 30A successively executes the processing from step S260 to step S420 on each first intermediate region 202 for scanning output at step S230. This processing is performed for all first intermediate regions 202 to be scanned. For example, if executing step 230 for the photo such as shown in FIG. 21, as shown in FIG. 26, high luminance parts and low luminance parts, such as the first intermediate regions 202-4, 202-7, 202-11, and 202-15, are decided as objects of this processing.

Below, in this embodiment, the processing on the high luminance parts and low luminance parts will be explained taking as an example the first intermediate regions 202-4 and 202-7.

Step S260

Figure 27:
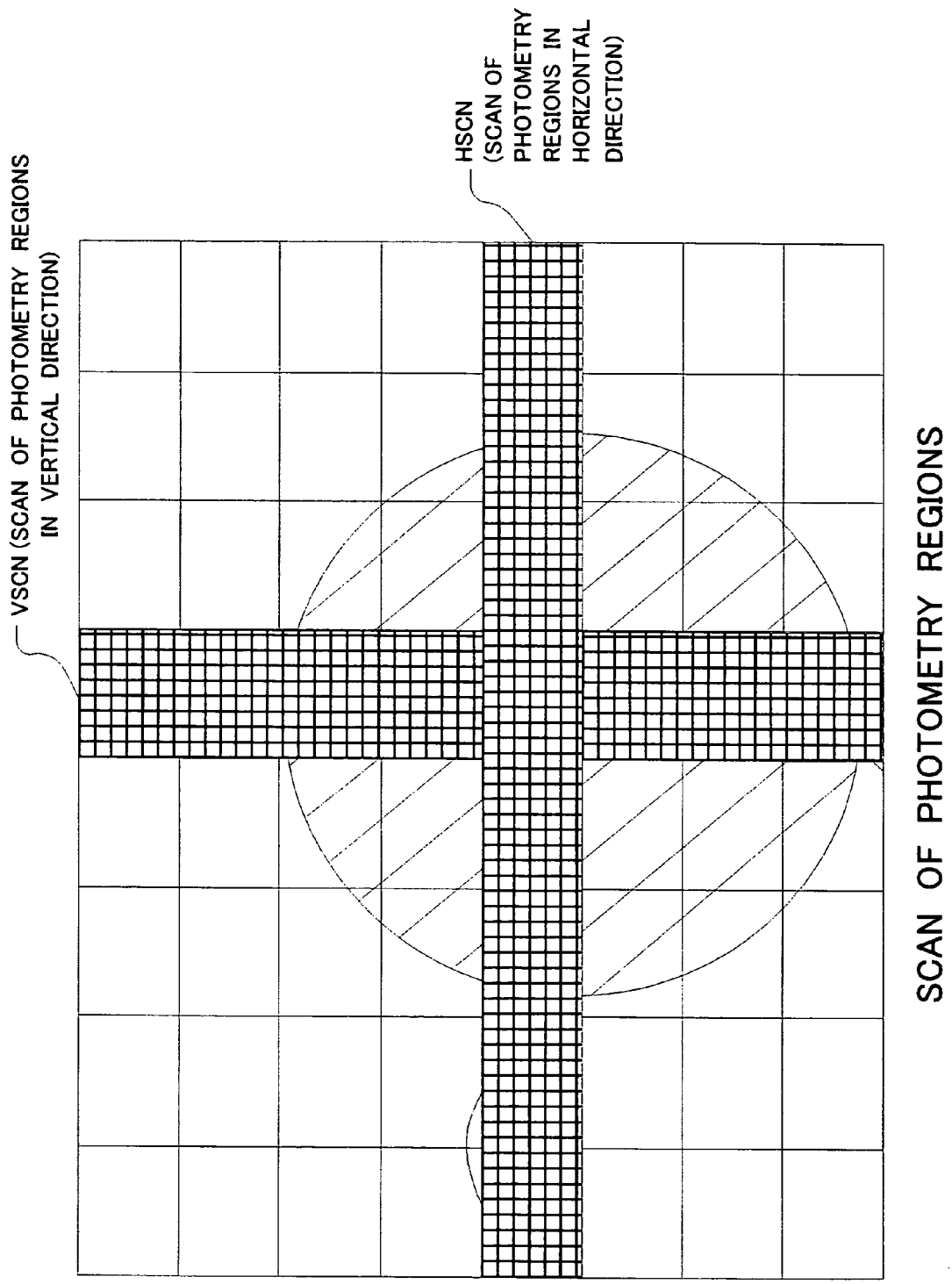
FIG. 27 is a view for explaining an example of the operation of an image capturing apparatus shown in FIG. 18 and shows a scan operation of photometry regions.

The exposure control unit 30A, as shown in FIG. 27, scans the cumulative luminance values of the small regions in the horizontal and vertical directions of the observation point of the object field (VSCN, HSCN) and compares each of them with the average luminance value of the object field as a whole.

Step S270

The exposure control unit 30A judges if the results of comparison obtained from step S260 include a region where the difference from the total average luminance is a certain value or more (for example, 2 EV or more). When judging that there is a region where the luminance difference is a certain value or more, the routine proceeds to step S310, while when judging it does not, the routine proceeds to step S280.

When the exposure control unit 30A judges by step S270 that there is no region with such a luminance difference, it judges if the scanned first intermediate region 202 is the maximum size which can be prepared in the object field. When the size is the maximum, the routine proceeds to step S290, while when it is still not the maximum, the routine proceeds to step S300.

Step S290

The exposure control unit 30A sets the weighting of the scanned first intermediate region 202 to 1, and then the routine proceeds to step S430.

Step S300

Figure 28:
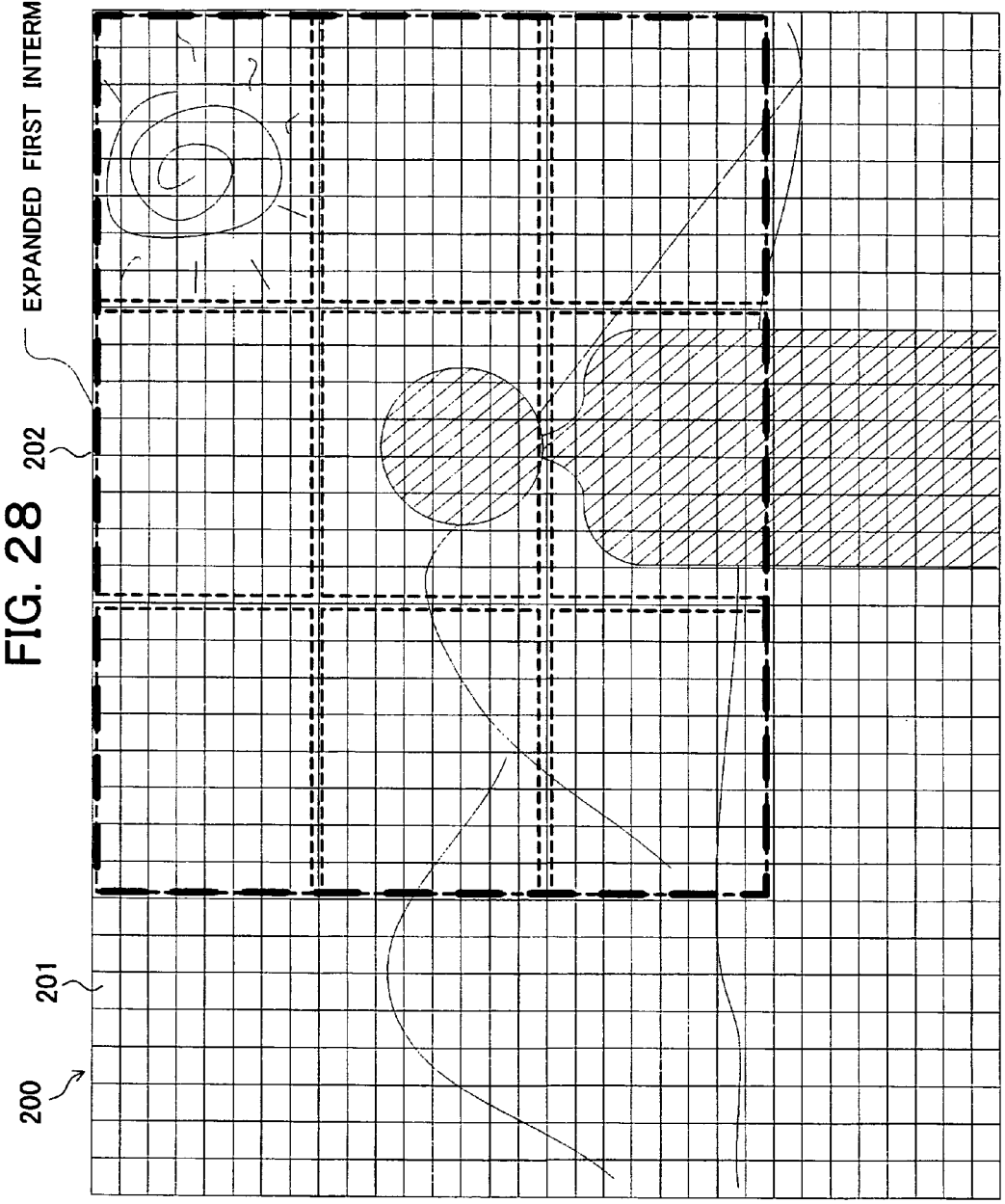
FIG. 28 is a view for explaining an example of the operation of an image capturing apparatus shown in FIG. 18 and shows an example combining adjoining regions to expand a first intermediate region.
Figure 29:
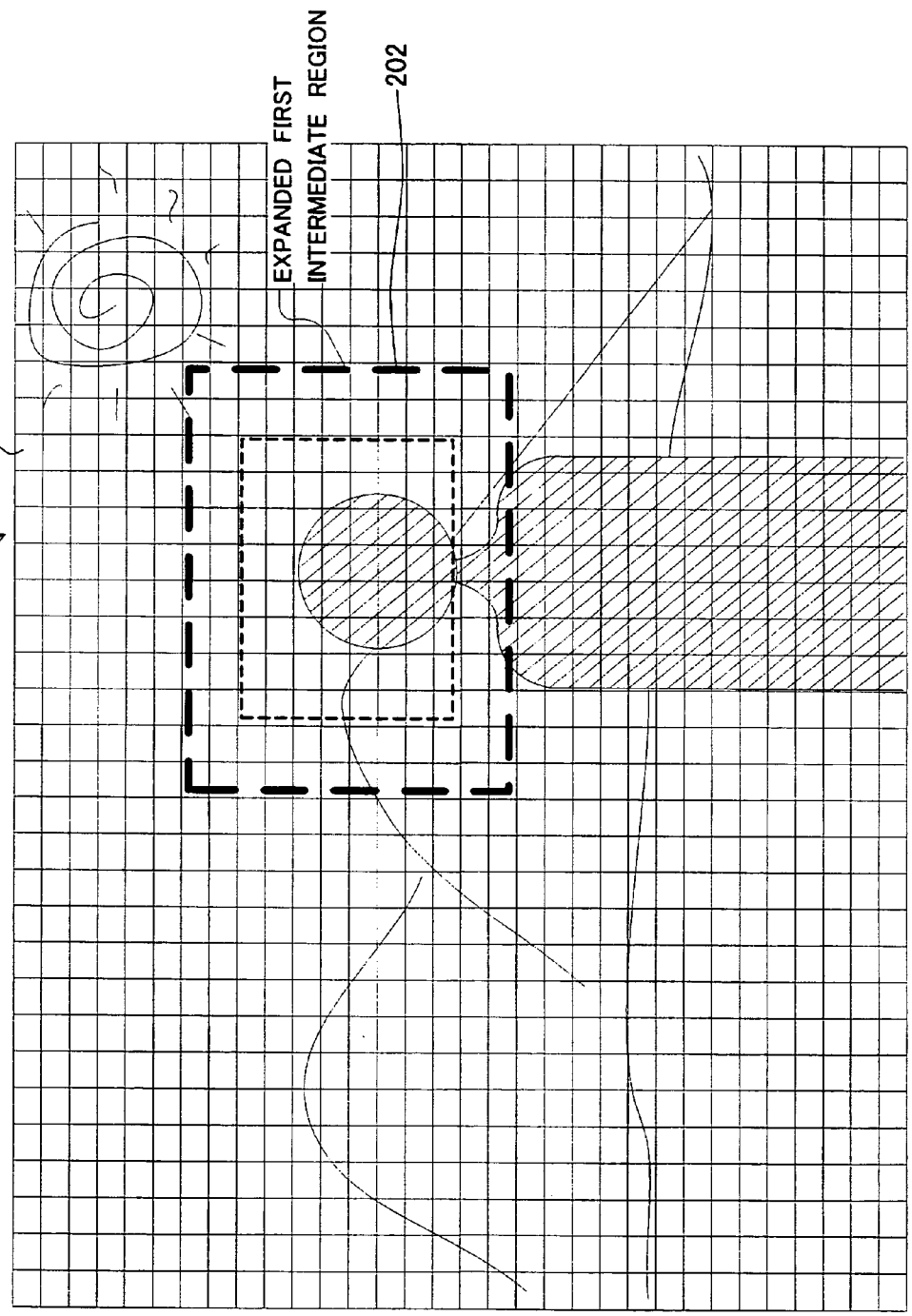
FIG. 29 is a view for explaining an example of the operation of an image capturing apparatus shown in FIG. 18 and shows an example of combining two columns of peripheral small regions to expand a first intermediate region.

The exposure control unit 30A expands the scanned first intermediate region 202. This may be expanded by, for example, as shown in FIG. 28, combining first intermediate regions adjoining the first intermediate region or, as shown in FIG. 29, adding several peripheral columns of small regions. After expanding the first intermediate region, it returns to step S270 where it again scans the expanded first intermediate region 202.

Step S310.

Figure 30:
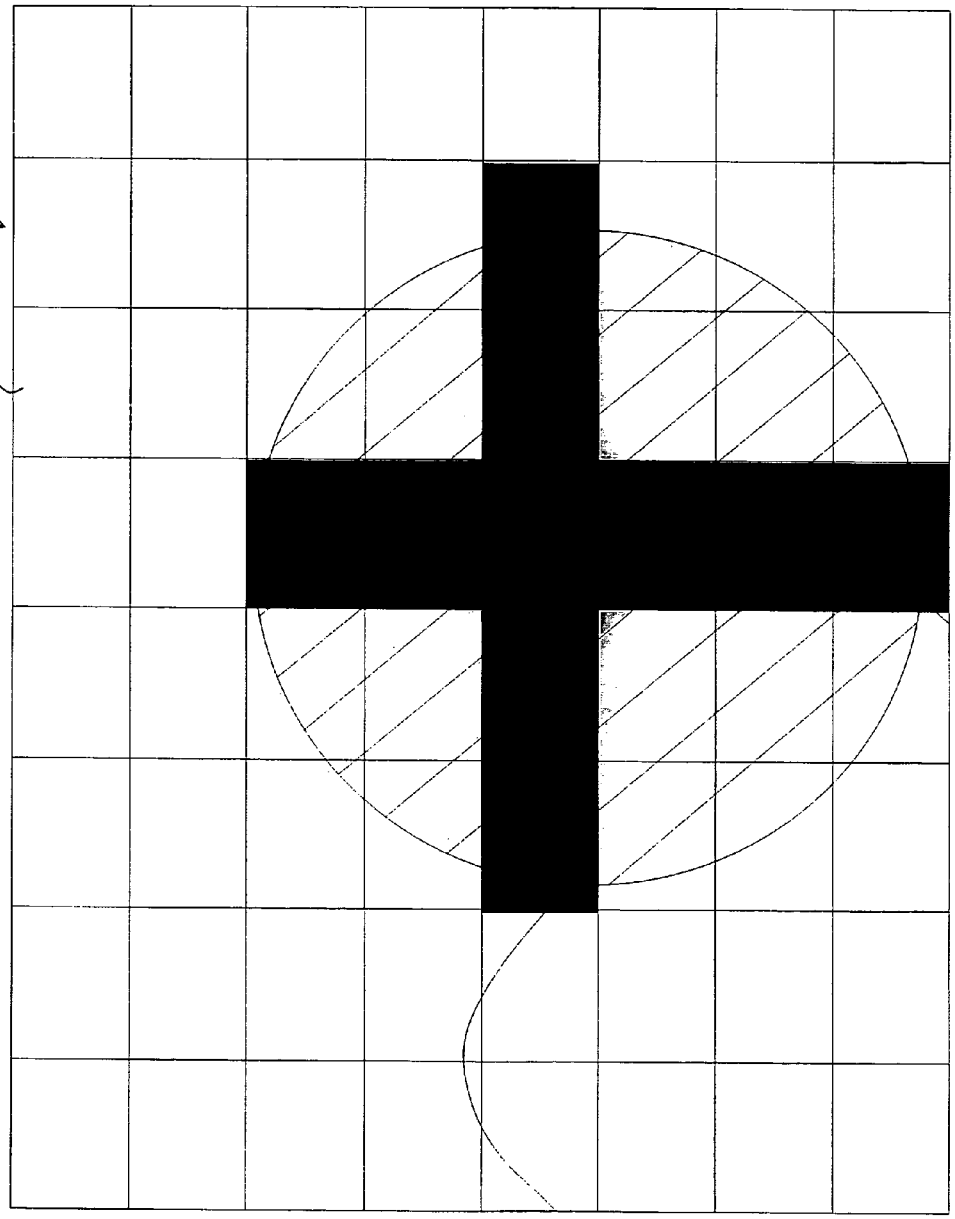
FIG. 30 is a view for explaining an example of the operation of an image capturing apparatus shown in FIG. 18 and shows an example of grouping regions with a large luminance difference.

The exposure control unit 30A, as shown in FIG. 30, groups the regions with large luminance differences detected by the scan of the photometry regions of step S270 in the horizontal and vertical directions.

Step S320

The exposure control unit 30A judges if all of the group regions generated at step S310 are on intersections of horizontal and vertical direction scan regions. If all of the grouped regions are on intersections, the routine proceeds to step S360, while when not, the routine proceeds to step S330.

Step S330

The exposure control unit 30A judges if the number of scans of the photometry regions executed at step S270 has exceeded a prescribed number. If over the prescribed number of scans has already been performed, the routine proceeds to step S360, while when not, the routine proceeds to step S340.

Step S340

Figure 31:
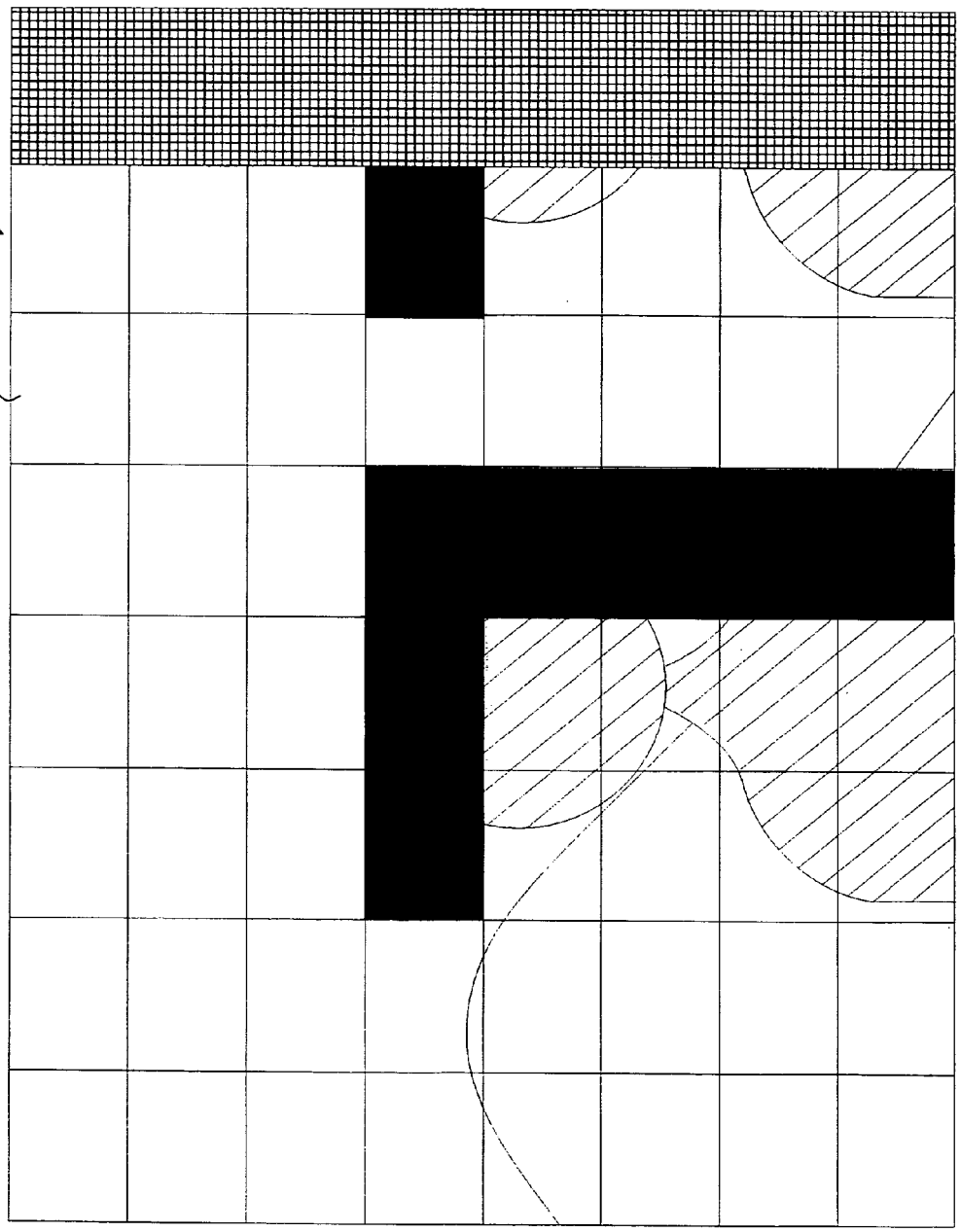
FIG. 31 is a view for explaining an example of the operation of an image capturing apparatus shown in FIG. 18 and shows an example of scanning the grouped regions in the vertical direction of the grouped region.

The exposure control unit 30A scans the photometry regions in the vertical direction of any grouped region judged not to be present on an intersection of photometry regions at step S330 and groups that grouped region and regions close in luminance value (for example, luminance difference of 2 EV or less). This processing is performed, for example, as shown in FIG. 31, to detect any plurality of high luminance parts or low luminance parts present in a first intermediate region.

Step S350

Figure 32:
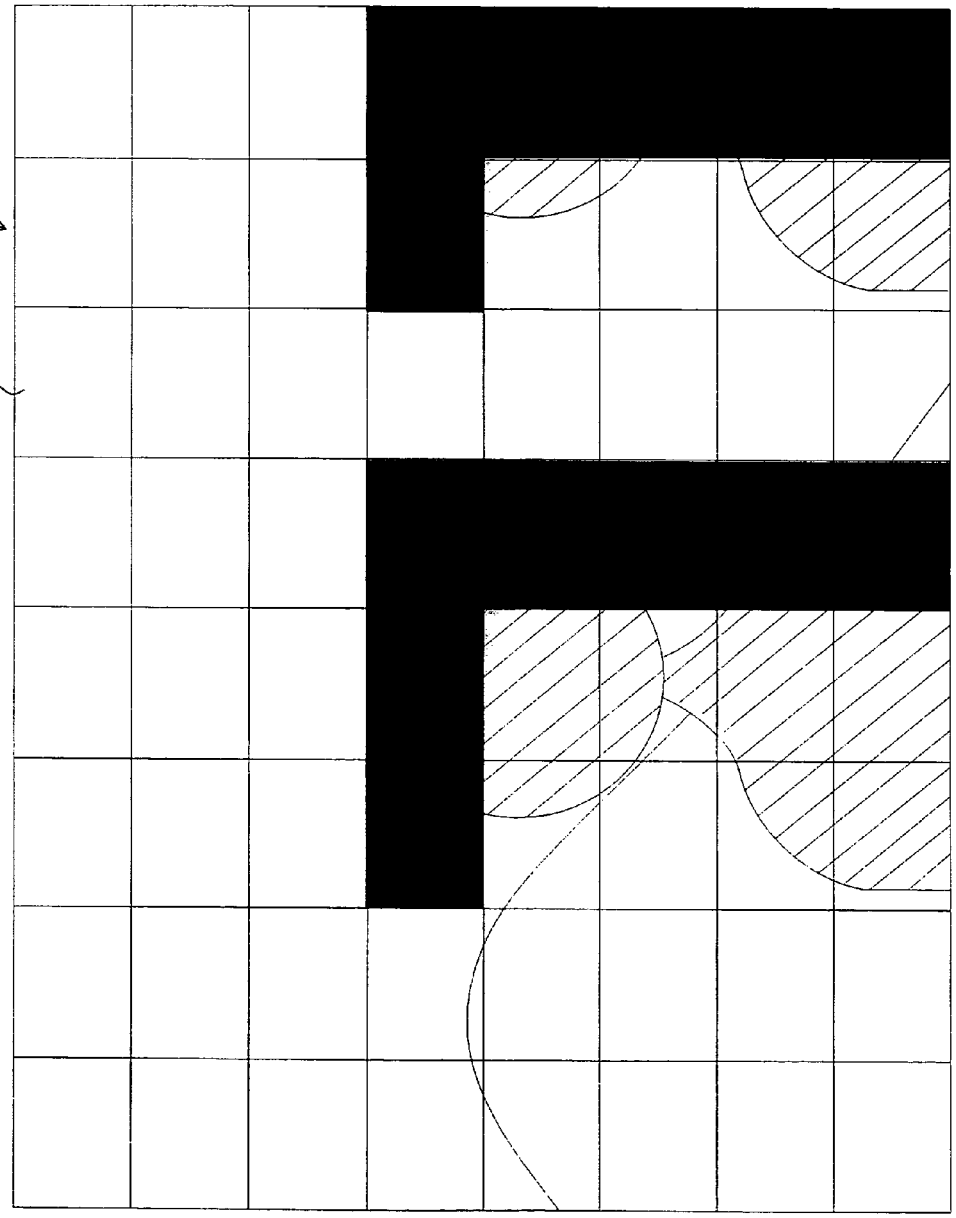
FIG. 32 is a view for explaining an example of the operation of an image capturing apparatus shown in FIG. 18 and shows an example of grouping newly detected regions with a luminance difference of a certain value or more.

The exposure control unit 30A judges if there are any regions with differences from the average luminance of the object field as a whole of a certain value or more (for example, 2 EV or more) present other than the regions grouped at step S340 by the scan of the photometry regions performed at step S340. When it is judged that there are any regions where the luminance difference is a certain value or more, the routine proceeds to step S310, where, as shown in FIG. 32, the regions are grouped, and then the same processing is repeated. When it is judged that there are not any new regions with a luminance difference of a certain value or more, the routine proceeds to step S360.

Step S360

Figure 33:
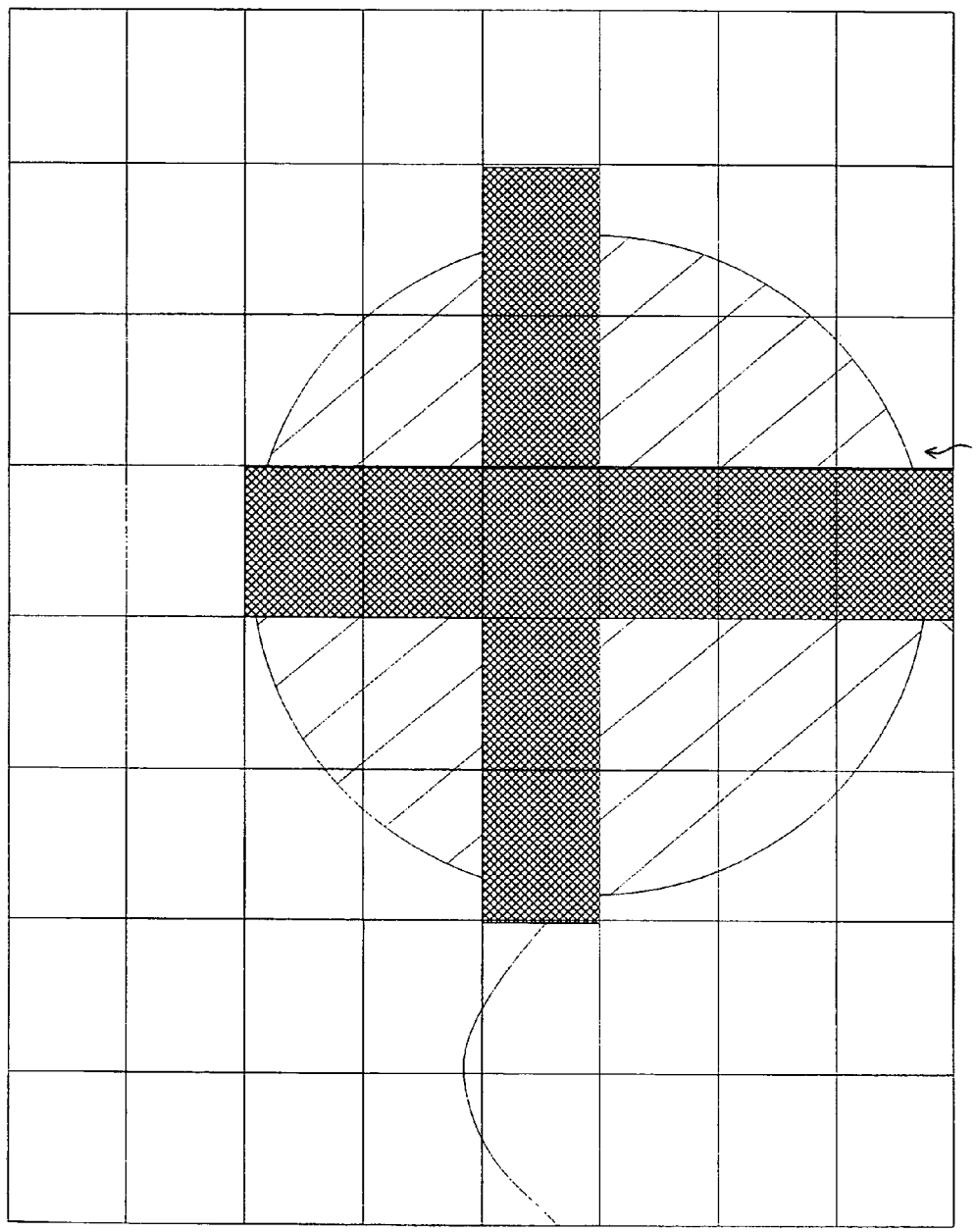
FIG. 33 is a view for explaining an example of the operation of an image capturing apparatus shown in FIG. 18 and shows an example of a basic photometry region.
Figure 34:
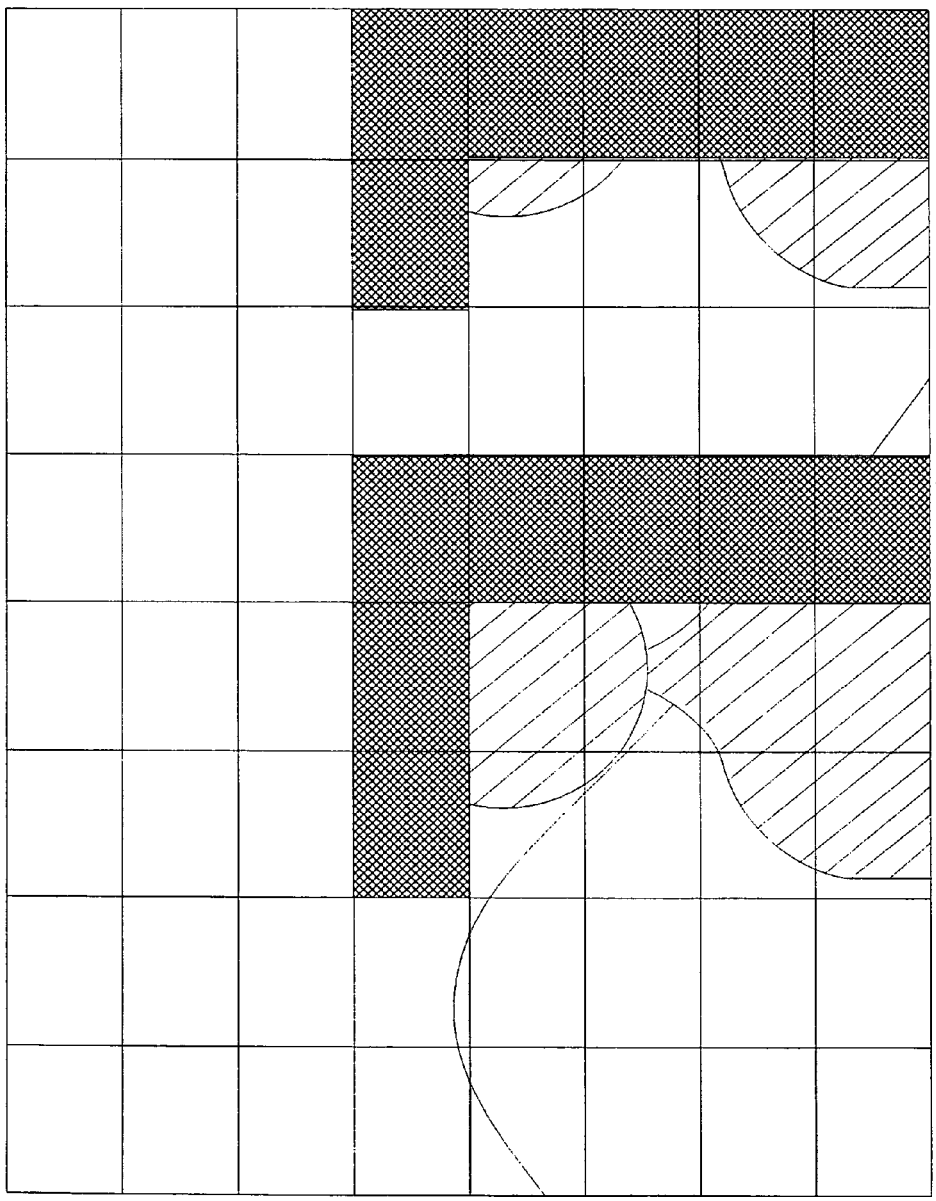
FIG. 34 is a view for explaining an example of the operation of an image capturing apparatus shown in FIG. 18 and shows an example of basic photometry regions in the case where there are a plurality of regions with a large luminance difference.

The exposure control unit 30A combines the mutually intersecting regions among the grouped regions obtained as a result of execution of step S260 to step S350 to prepare basic photometry regions 204 as shown in FIG. 33. Like in the example shown in FIG. 31, when there are a plurality of objects with large luminance differences in the first intermediate luminance region, for example, as shown in FIG. 34, a plurality of basic photometry regions 205 are prepared.

Step S370

Figure 35:
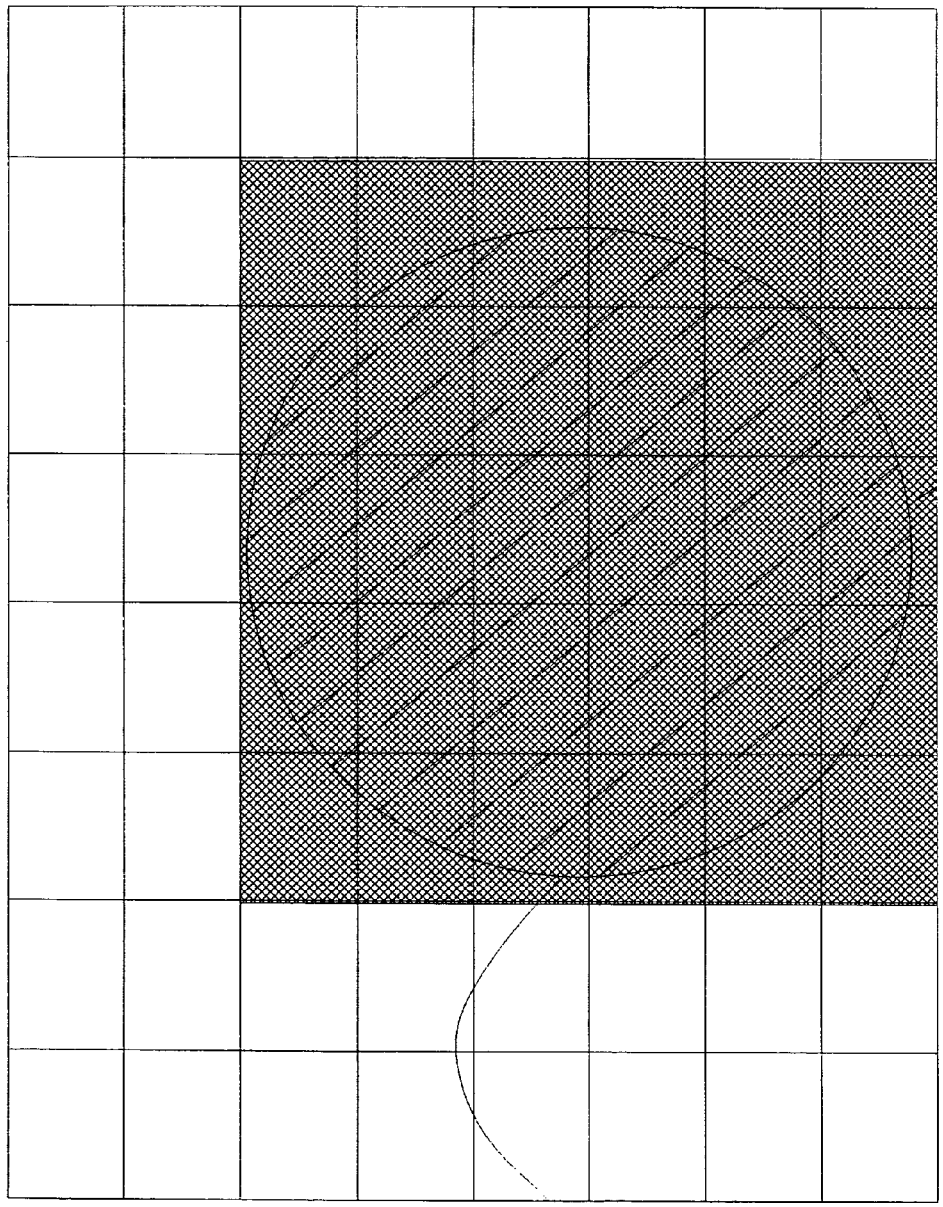
FIG. 35 is a view for explaining an example of the operation of an image capturing apparatus shown in FIG. 18 and shows an example of second intermediate regions.
Figure 36:
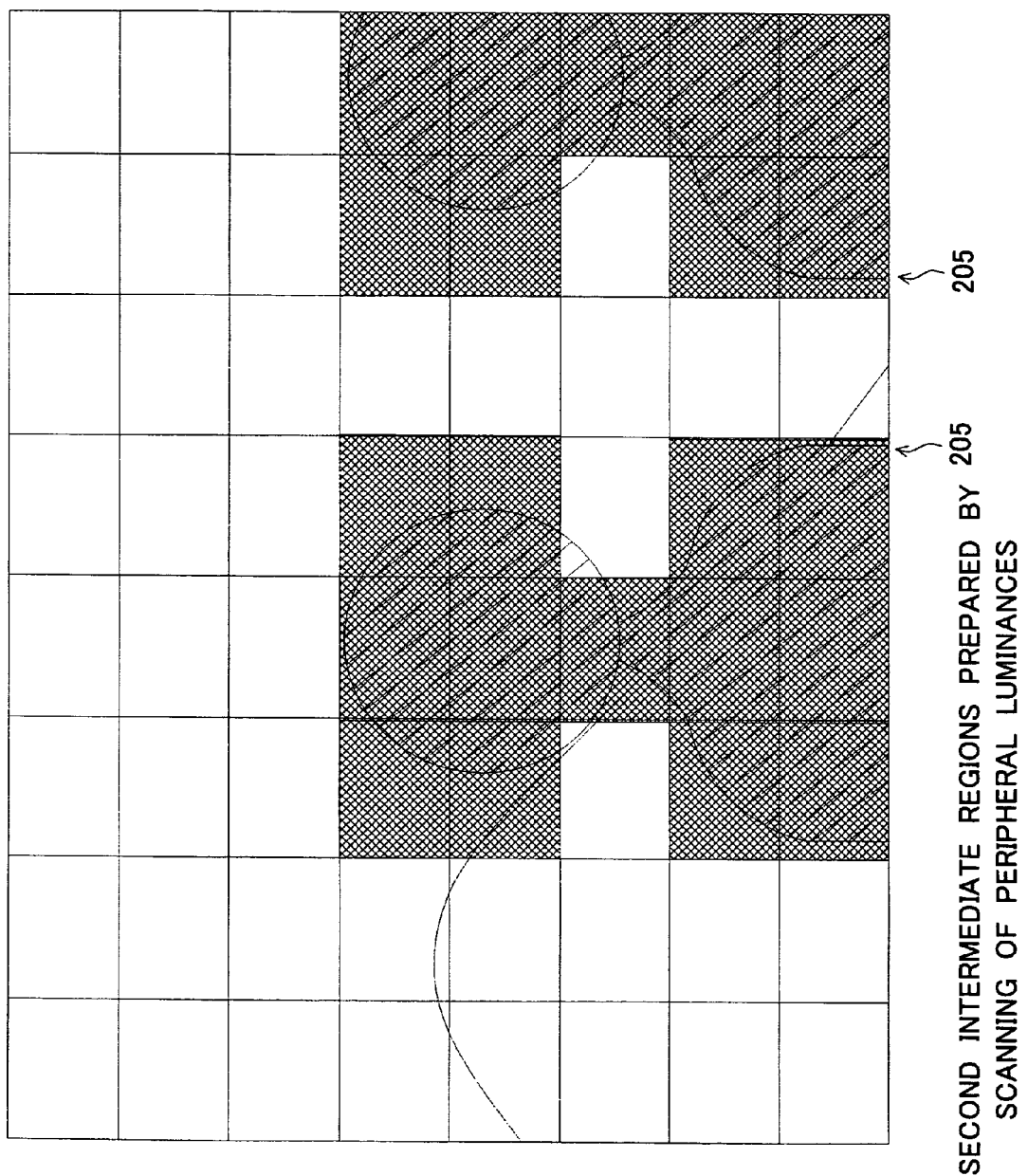
FIG. 36 is a view for explaining an example of the operation of an image capturing apparatus shown in FIG. 18 and shows an example of second intermediate regions prepared by a scan of peripheral luminance.
Figure 37:
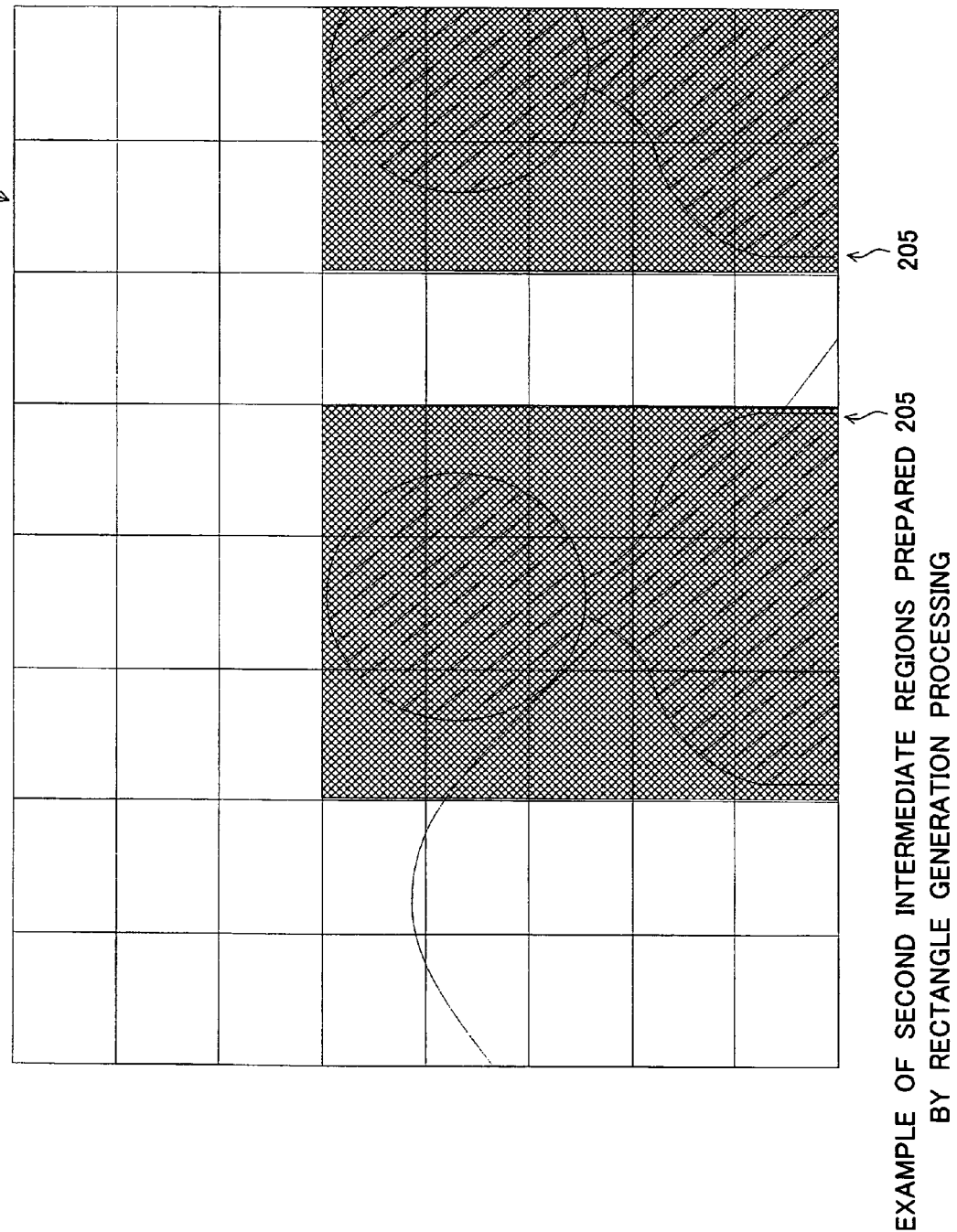
FIG. 37 is a view for explaining an example of the operation of an image capturing apparatus shown in FIG. 18 and shows an example of second intermediate regions prepared by rectangle generation processing.

The exposure control unit 30A checks the luminances of the photometry regions around the basic photometry regions prepared at basic step S360 and adds the regions with close luminance to the basic photometry regions 205 to prepare a second intermediate region 206 as shown in FIG. 35. The photometry regions added may be selected, for example, as shown in FIG. 36, as the regions with a luminance difference from the basic photometry region of a certain value or less (for example 1 EV or less) or as a rectangular region encompassing the basic photometry region for simplification of the processing, as shown in FIG. 37.

Step S380

The exposure control unit 30A judges if the average luminance value of each second intermediate region 206 prepared at step S370 is higher than the total average luminance value. When the second intermediate region 206 is judged to be a high luminance region, the region judged to be a high luminance is processed as shown in step S390. When the second intermediate region 206 is judged to be a low luminance region, the region judged to be a low luminance is processed as shown in step S400.

Step S390

The exposure control unit 30A performs high luminance region processing on the first intermediate region judged as a high luminance at step S380. The "high luminance region processing" referred to here means processing to reduce the effect of the region luminance on the exposure value and is, for example, processing for preventing the sun or other light source from causing the exposure value to be biased to the under direction. As this processing, for example, the average luminance value of the intermediate region may be replaced by a predetermined certain value or the weighting value of the intermediate region may be replaced with a predetermined certain value. Further, it is also possible to perform processing for removing the intermediate region from the photometry object in the exposure determination. In the present embodiment, the region including the sun, that is, the first intermediate region 202-4, is covered by this processing. When the above processing ends, the routine proceeds to step S430.

Step S400

Figure 38:
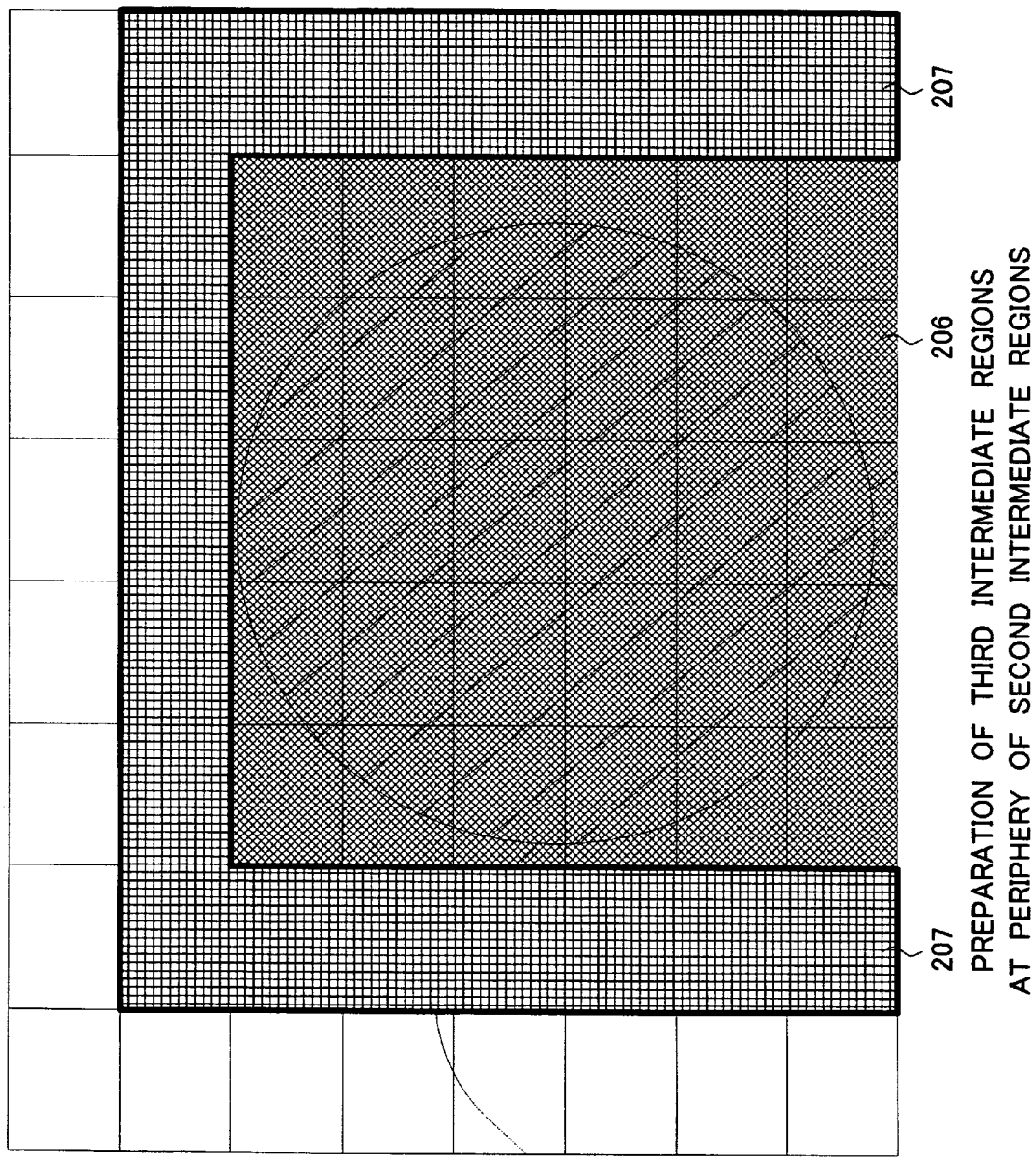
FIG. 38 is a view for explaining an example of the operation of an image capturing apparatus shown in FIG. 18 and shows an example of the preparation of third intermediate regions at the periphery of second intermediate regions.

The exposure control unit 30A groups the photometry regions surrounding the second intermediate regions 206 judged as low luminance at step S380 as shown in FIG. 38 to prepare third intermediate regions 207. As the method of preparation, for example, it is possible to cover regions within a certain value (for example, within 2 EV) of the second intermediate regions or to cover photometry regions of certain peripheries of the second intermediate regions (for example, two columns of small regions 1).

Step S410

The exposure control unit 30A calculates the difference of the average luminance values of each second intermediate region 206 prepared at step S370 and each third intermediate region 207 prepared at the periphery at step S400.

Step S420

Figure 39:
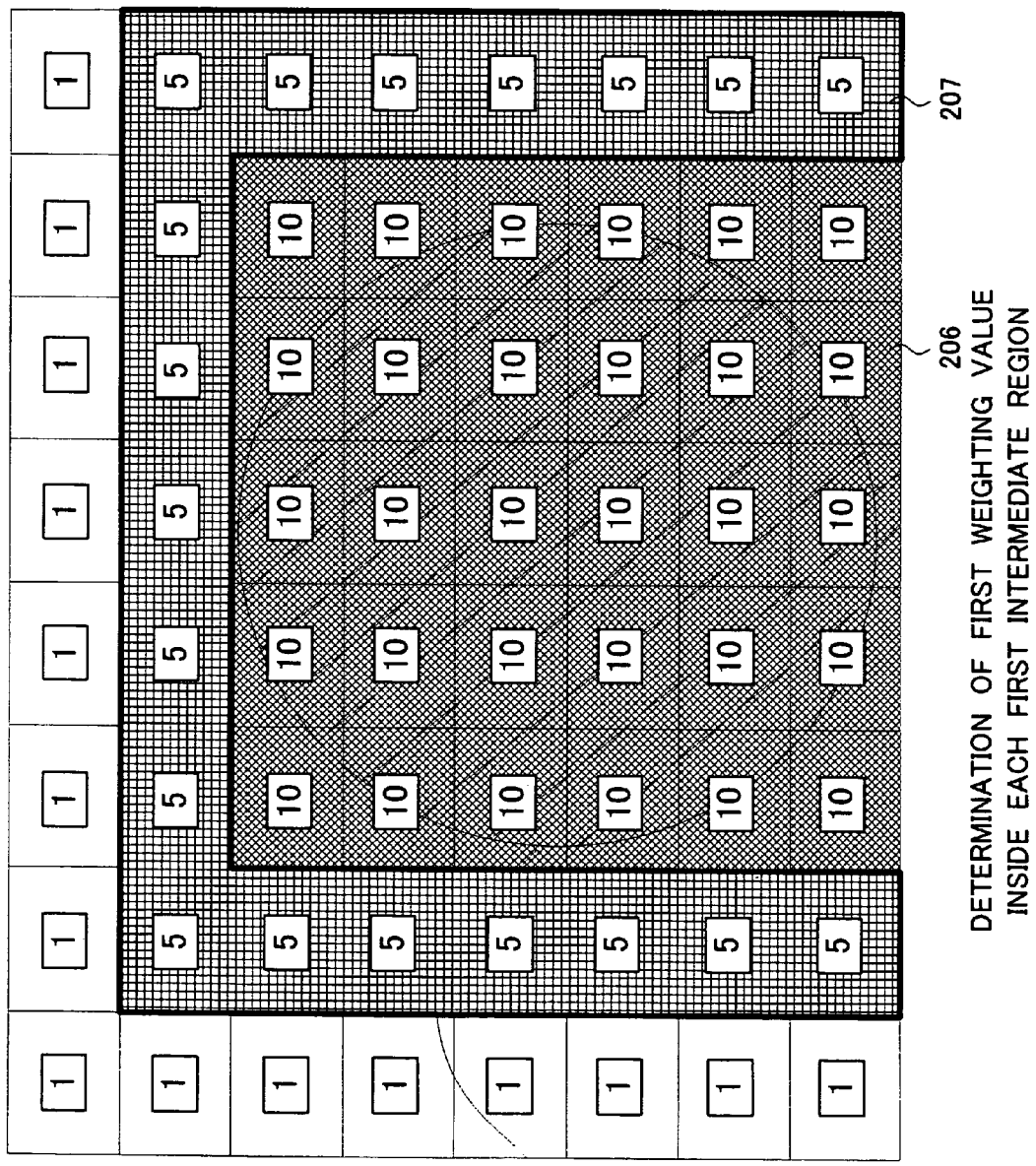
FIG. 39 is a view for explaining an example of the operation of an image capturing apparatus shown in FIG. 18 and shows an example of the determination of a first weighting value in each first intermediate region.

The exposure control unit 30A determines the first weighting value of the first intermediate regions, for example, as shown in FIG. 39, from the average luminance difference of each second intermediate region 206 and each third intermediate region 207 calculated at step S410. When, for example, the average luminance difference between the second intermediate region and third intermediate region is large, it is judged that the object of the intermediate region is in a strong back light state and the weighting of the second intermediate region 206 is increased. Further, it is also possible to utilize the area occupied by the second intermediate region 206 at the object field and the area ratio between the second intermediate region 206 and third intermediate region 207 at the time of weighting.

Step S430

Figure 40:
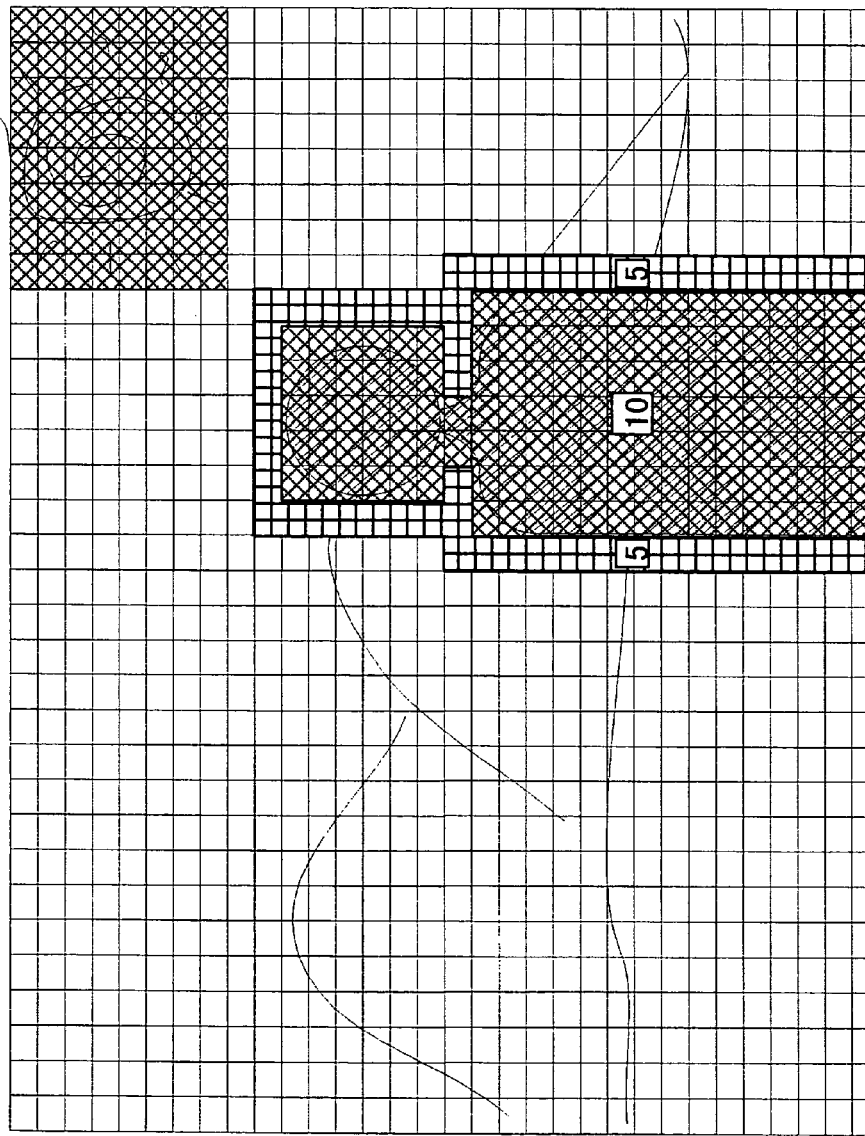
FIG. 40 is a view for explaining an example of the operation of an image capturing apparatus shown in FIG. 18 and shows each intermediate region in the object field as a whole.

The exposure control unit 30A confirms if the processing from S250 to S420 has been executed for all of the first intermediate regions 202 detected at S230. If there is any first intermediate region 202 not yet processed, it returns to step S240 and executes the above processing. After the processing of all of the first intermediate regions 202 has ended, the routine proceeds to step S440. In the case of the second embodiment, if performing the above processing for all of the first intermediate regions 202, as shown in FIG. 40, the second and third intermediate regions and high luminance processing regions 208 are determined and their first weighting values (low luminance regions), replacement luminance values, replacement weighting values, or regions for removal from the exposure calculation (high luminance regions) are determined.

Step S440

The exposure control unit 30A determines the second weighting value of each first intermediate region 202 from the position of the first intermediate region, for example, as shown in FIG. 41. For example, it is possible to use the distance of the first intermediate region, from the center of the object field for the weighting (for example, for a region near the center, increasing the weighting and, for a far one, reducing the weighting) or utilize the distance from the first intermediate region designated by the user for the weighting. Further, in the case of an auto focus device, it is also possible to use the distance from the measurement point used for the focusing in the object field for the weighting. Further, in the case where there are a plurality of measurement points, it is also possible to utilize the distance to the object detected at the measurement point included in each first intermediate region and the distance to the main object for the weighting (for example, when the detected distances of the object of the focusing and the measurement point at each first intermediate region are substantially the same, increasing the weighting and, when the distances are different, reducing the weighting). Further, in a region where a plurality of intermediate regions overlap, it is also possible to use the average value of the second weighting values of the intermediate regions.

Step S450

The exposure control unit 30A calculates the weighted small region luminance values from the first and second weighting values determined at step S420 and step S440 and the individual small region luminance values and averages these to calculate the final evaluation value of the object field exposure. Using the above calculated final evaluation value, the exposure control unit 30A controls the iris 12, the shutter 13, and the A/D conversion circuit 16 for the image capture and outputs the captured image to the image processing unit 70. The image processing unit 70 performs, for example, white balance and γ curve correction and other processing to generate image data which it outputs to the image storage unit 80. The image storage unit 80 writes the image data IM input from the image combining unit 60 to the memory 90.

As explained above, according to the image capturing apparatus 1A, the object field is divided for photometry as shown in FIG. 22 and then the image is captured. At that time, since the object field is divided into a plurality of intermediate regions and the change in luminance in the horizontal and vertical directions in each region is confirmed to confirm the state of the object, even if, for example, a plurality of objects of different sizes are in a back light state, image capture by a suitable exposure becomes possible. Further, even if the object field includes a light source or other high luminance object, the region is detected and the weighting, etc. is changed so as to enable the possibility of a photograph with insufficient exposure that is being taken to be reduced.

Note that in the present embodiment, the explanation was given taking as an example the capture of an image of an object in a back light state, but the same method is also effective at the time of a flash operation. In the flash operation, before image capture, a preflash operation is performed to determine the suitable amount of exposure in the usual technique, but by using the above photometry method at the time of photometry during a preflash operation, for example, even when there is a metal or other high reflectance object near the main object, it becomes possible to reduce the effect of reflected light from that object and capture the main object by a suitable exposure value.

It should be understood by those skilled in the art that various modifications, combinations, sub-combinations, and alterations may occur depending on design requirements and other factors insofar as they are within the scope of the appende claims or the equivalents thereof.

We claim:

1. An image capturing apparatus comprising:
   an image capturing means,
   a photometry means for dividing image data output from the image capturing means into a plurality of regions and measuring a luminance of each of the divided regions,
   a grouping means for generating a plurality of intermediate regions from object luminances output from said photometry means,
   an evaluation value calculating means for generating an exposure evaluation value from the luminances of said intermediate regions, and
   a control means for suitably controlling the exposure for image capture in accordance with said measured luminances,
   wherein said grouping means further includes a means for scanning luminance information output from the photometry means in a horizontal and vertical direction from an observation point, confirming a difference between the luminance of each small photometry region and an average luminance of an object field as a whole, and grouping high luminance regions and low luminance regions of the object field as first intermediate regions.

2. The image capturing apparatus as set forth in claim 1, wherein when scanning luminance values in the above horizontal and vertical directions, said grouping means may set one or more observation points, the one or more observation points including either a center of a screen, a measurement point, a face detection region, any other designated point as the observation point, or combination thereof.

3. The image capturing apparatus as set forth in claim 1, wherein said grouping means further includes a means for searching for luminances at peripheries of the generated first intermediate regions and grouping regions meeting predetermined conditions as second intermediate regions.

4. The image capturing apparatus as set forth in claim 3, wherein said evaluation value calculating means includes a means for assigning weighting in accordance with a luminance difference of the generated first intermediate region and second intermediate region to each intermediate region.

5. The image capturing apparatus as set forth in claim 3, wherein said evaluation value calculating means includes a means for assigning weighting to each intermediate region in accordance with positions of the generated first intermediate region and second intermediate region.

6. The image capturing apparatus as set forth in claim 5, wherein said evaluation value calculating means includes a means for weighting a luminance measured by the photometry means in accordance with the weighting to calculate a weighted object luminance.

7. An image capturing apparatus comprising:
   an image capturing means,
   a photometry means for dividing image data output from said image capturing means into a plurality of regions and measuring a luminance of each of the divided regions,
   a grouping means for generating a plurality of intermediate regions from object luminances output from said photometry means,
   an evaluation value calculating means for generating an exposure evaluation value from luminances of said intermediate regions, and
   a control means for suitably controlling the exposure for image capture in accordance with said measured luminance, wherein
   said grouping means includes a means for dividing object luminance information output from the photometry means into a plurality of first intermediate regions, scanning first intermediate regions with a luminance difference from a total average luminance of a certain value or more or a designated one or more first intermediate regions in the horizontal and vertical directions to confirm the luminance difference from the total average luminance, and grouping any region with a luminance difference of a certain value or more as second intermediate regions.

8. The image capturing apparatus as set forth in claim 7, wherein said grouping means has a means for searching for luminances at peripheries of a generated second intermediate region and grouping any region meeting predetermined conditions as a third intermediate region.

9. The image capturing apparatus as set forth in claim 8, wherein said evaluation value calculating means has a means for assigning a first weighting value in accordance with a luminance difference of a generated second intermediate region and third intermediate region to each region.

10. The image capturing apparatus as set forth in claim 7, wherein said evaluation value calculating means includes a second weighting value generating means for assigning a second weighting value to each generated first intermediate region.

11. The image capturing apparatus as set forth in claim 10, wherein said second weighting value generating means may determine the weighting value from at least one of a distance from a center of a screen, a distance from a measurement point, an object distance in each region, a face detection region, a distance from a designated first intermediate region.

12. The image capturing apparatus as set forth in claim 10, wherein said evaluation value calculating means includes a means for weighting a luminance measured by the photometry means in accordance with the weighting value to calculate a weighted object luminance.

13. An image capturing apparatus comprising:
   an image capturing unit,
   a photometry unit configured to divide image data output from said image capturing unit into a plurality of regions and measure a luminance of each of the divided regions,
   a grouping unit configured to generate a plurality of intermediate regions from object luminances output from said photometry unit,
   an evaluation value calculation unit configured to generate an exposure evaluation value from luminances of said intermediate regions, and
   a control unit configured to suitably control the exposure for image capture in accordance with said measured luminances, wherein said grouping unit is configured to divide object luminance information output from the photometry unit into a plurality of first intermediate regions, scan first intermediate regions with a luminance difference from a total average luminance of a certain value or more and a designated one or more first intermediate regions in the horizontal and vertical directions to confirm the luminance difference from the total average luminance, and group any region with a luminance difference of a certain value or more as second intermediate regions.

14. An image capturing method comprising the steps of:

dividing image data output from an image capturing means into a plurality of regions, measuring an object luminance of each of the divided regions, generating a plurality of intermediate regions from the measured object luminances, generating an exposure evaluation value from the luminances of said intermediate regions, and suitably controlling the exposure for image capture in accordance with said measured luminances, wherein said third step further comprises a step of scanning luminance information output from the photometry means in a horizontal and vertical direction from an observation point, confirming a difference between the luminance of each small photometry region and an average luminance of an object field as a whole, and grouping high luminance regions and low luminance regions of the object field as first intermediate regions.

15. An image capturing method comprising the steps of:

dividing image data output from an image capturing means into a plurality of regions, measuring an object luminance of each of the divided regions, generating a plurality of intermediate regions from the measured object luminances, generating an exposure evaluation value from the luminances of said intermediate regions, and suitably controlling the exposure for image capture in accordance with said measured luminances, wherein said third step further comprises a step of dividing object luminance information output at the second step into a plurality of first intermediate regions, scanning first intermediate regions with a luminance difference from a total average luminance of a certain value or more or a designated one or more first intermediate regions in the horizontal and vertical directions to confirm the luminance difference from the total average luminance, and grouping any region with a luminance difference of a certain value or more as second intermediate regions.

16. The image capturing method as set forth in claim 15, wherein said third step further comprises a step of searching for luminances at peripheries of a generated second intermediate region and grouping any region meeting predetermined conditions as a third intermediate region.

* * * * *